(12) United States Patent
Ramsey et al.

(10) Patent No.: US 12,499,005 B2
(45) Date of Patent: Dec. 16, 2025

(54) HYBRID FIRMWARE-FIRST/OPERATING-SYSTEM-FIRST ERROR HANDLING SYSTEM

(71) Applicant: Dell Products L.P., Round Rock, TX (US)

(72) Inventors: Scott Michael Ramsey, Cedar Park, TX (US); Wei Liu, Austin, TX (US); David Keith Chalfant, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 114 days.

(21) Appl. No.: 18/497,226

(22) Filed: Oct. 30, 2023

(65) Prior Publication Data

US 2025/0138933 A1 May 1, 2025

(51) Int. Cl.
*G06F 11/07* (2006.01)
*G06F 9/4401* (2018.01)

(52) U.S. Cl.
CPC ........ *G06F 11/0793* (2013.01); *G06F 9/4401* (2013.01)

(58) Field of Classification Search
CPC . G06F 11/1417; G06F 9/4401; G06F 11/0793
See application file for complete search history.

(56) References Cited

U.S. PATENT DOCUMENTS

| 7,546,487 | B2 * | 6/2009 | Marisetty | G06F 11/0706 |
| | | | | 714/10 |
| 8,713,350 | B2 * | 4/2014 | Walton | G06F 11/0766 |
| | | | | 714/48 |
| 10,896,087 | B2 * | 1/2021 | Shantamurthy | G06F 11/0715 |
| 2021/0255939 | A1 * | 8/2021 | Chaiken | G06F 11/0757 |
| 2023/0229558 | A1 * | 7/2023 | Warkentin | G06F 11/0757 |
| | | | | 714/55 |

* cited by examiner

*Primary Examiner* — Bryce P Bonzo
*Assistant Examiner* — Xinyuan Yu
(74) *Attorney, Agent, or Firm* — Joseph Mencher

(57) ABSTRACT

A hybrid firmware-first/operating-system-first error handling system includes a Basic Input/Output System (BIOS) subsystem coupled to a processing system. The BIOS subsystem begins an initialization process for a computing device and, in response, configures the processing system to perform processing system firmware-first error handling operations and, for any errors that are detected during at least a portion of the initialization process, performs BIOS firmware-first error handling operations. During the initialization process, the BIOS subsystem determines that an operating system provided by the processing system is configured to perform error handling and, in response, disables the performance of processing system firmware-first error handling operations by the processing system, and instructs the operating system to perform operating-system-first error handling operations such that the operating system performs the operating-system-first error handling operations for any errors that are detected during runtime of the computing device.

20 Claims, 20 Drawing Sheets

HYBRID FIRMWARE-FIRST/OPERATING-SYSTEM-FIRST ERROR HANDLING SYSTEM

BACKGROUND

The present disclosure relates generally to information handling systems, and more particularly to handling errors that occur in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, must "handle" errors that can occur in the computing device by anticipating, detecting, and resolving those errors. Conventional Reliability, Availability, and Serviceability (RAS) error handling is based on a "firmware-first" error handling model in which errors are handled by firmware (e.g., Basic Input/Output System (BIOS) firmware) before relinquishing control to an Operating-System-directed configuration and PowerManagement (OSPM) subsystem to perform further error handling operations. For example, in response to an error in the computing device (e.g., an asynchronous machine check identified or a Peripheral Component Interconnect express (PCIe) error signaled by processor hardware), a BIOS System Management Interrupt (SMI) will be generated and will trigger a BIOS System Management Mode (SMM) in which error detection and error logging are performed by the BIOS and one of skill in the art in possession of the present disclosure will appreciate how, once the BIOS SMM is completed, that error may then be handled by an operating system Machine Check Exception (MCE) or PCIe error handler. However, such firmware-first error handling models raise issues.

For example, one of skill in the art in possession of the present disclosure will appreciate how the performance of the error detection and logging described above using the SMI and SMM raises security concerns due to such SMIs providing a common target for exploits, while also introducing performance degradation issues due to the latency associated with the SMI/SMM that scales with a number of cores in the processing system of the computing device. One conventional solution to such issues is a conventional operating-system-first error handling model that eliminates some of the issues with the firmware first error handling model described above, but introduces other issues.

For example, such operating-system-first error handling models provide for the performance of error logging via the reporting of errors via an operating system error reporting interface directly to a user of the computing device, but do not provide for the reporting of errors to computing device management systems that do not manage the operating system in the computing device. For example, computing devices provided by DELL® Inc. of Round Rock, Texas, United States may be managed by a DELL® computing device management system that does not manage the operating system on those computing devices, and the conventional operating-system-first error handling models discussed above that only report errors via the operating system error reporting interface directly to a user make it difficult for such computing device management systems to service issues that occur with computing devices being managed, honor hardware guarantees for hardware in those computing devices, and/or perform other computing device management operations known in the art because the error handling scheme and error reporting thresholds are not managed by BIOS firmware or other firmware controlled by the computing device management system.

Accordingly, it would be desirable to provide an error handling system that addresses the issues discussed above.

SUMMARY

According to one embodiment, an Information Handling System (IHS) includes a Basic Input/Output System (BIOS) processing system; and a BIOS memory system that is coupled to the BIOS processing system and that includes instructions that, when executed by the BIOS processing system, cause the BIOS processing system to provide a BIOS engine that is configured to: begin an initialization process for a computing device and, in response, configure a primary processing system in the computing device to perform primary processing system firmware-first error handling operations; perform, for any errors that are detected during at least a portion of the initialization process, BIOS firmware-first error handling operations; determine, during the initialization process, that an operating system provided by the primary processing system is configured to perform error handling; disable, during the initialization process and in response to determining that the operating system is configured to perform error handling, the performance of primary processing system firmware-first error handling operations by the primary processing system; instruct, during the initialization process, the operating system to perform operating-system-first error handling operations such that the operating system performs the operating-system-first error handling operations for any errors that are detected during runtime of the computing device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
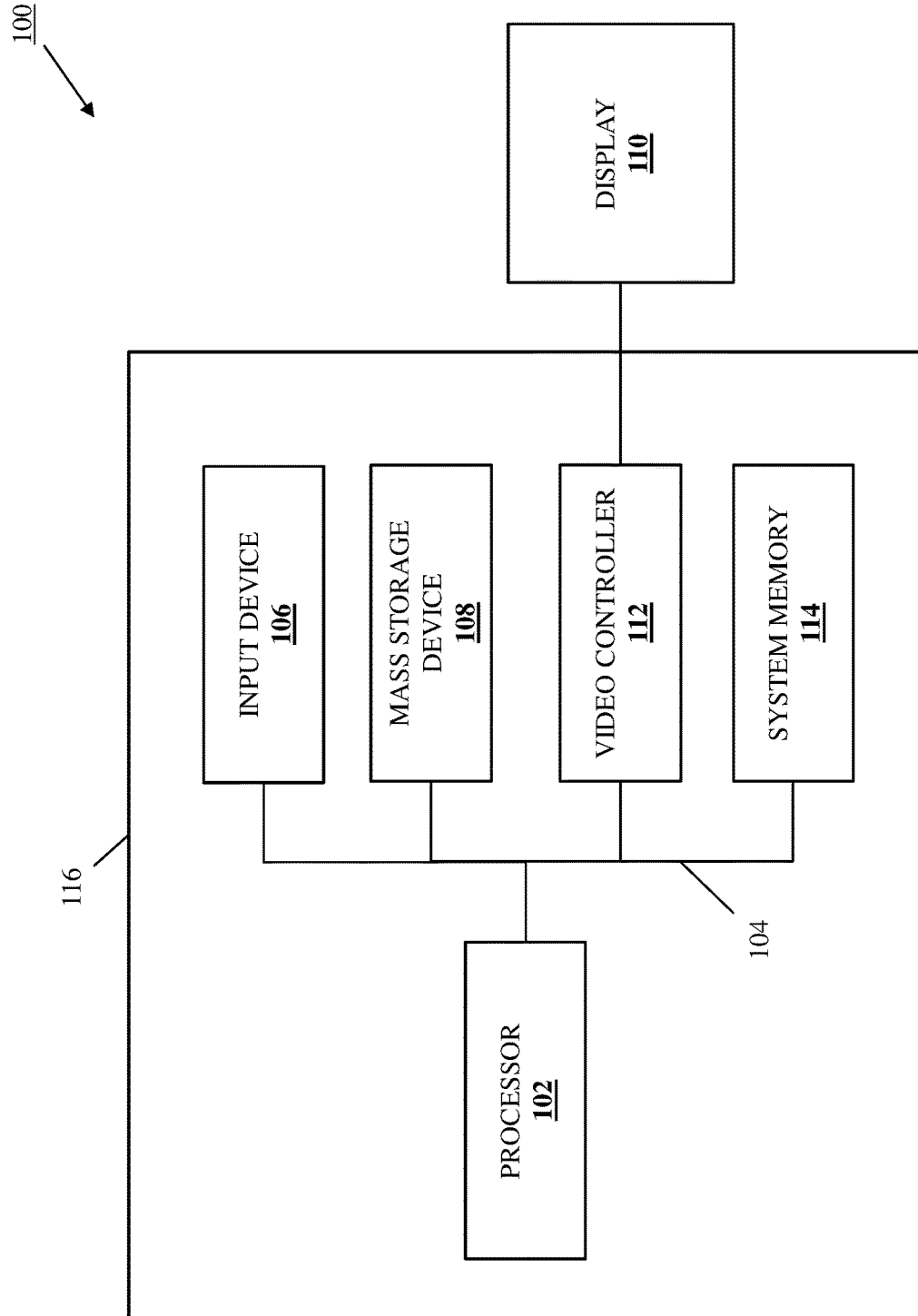
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
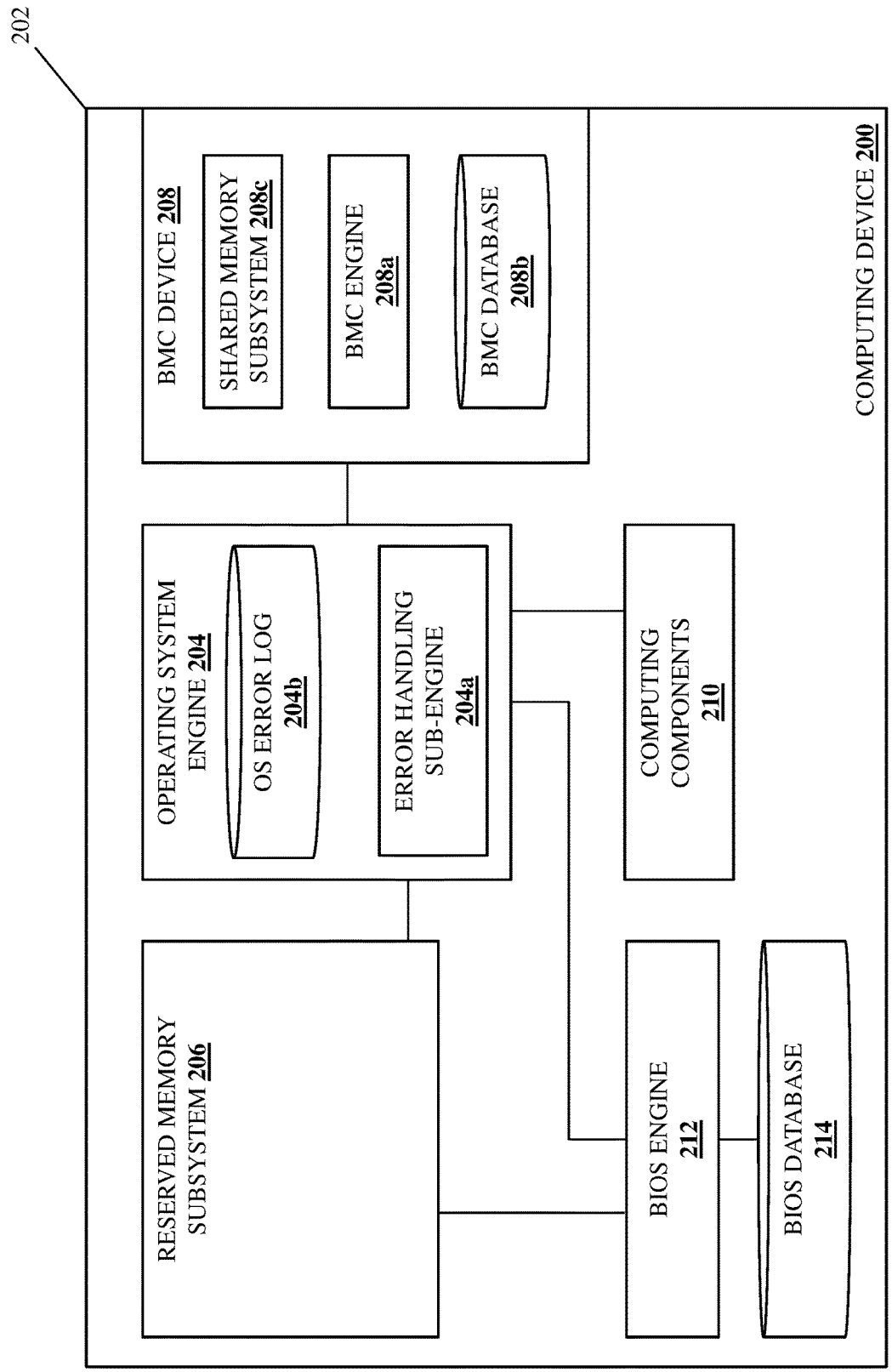
FIG. 2 is a schematic view illustrating an embodiment of a computing device that may include the operating-system-first error handling system of the present disclosure.

Referring now to FIG. 2, an embodiment of a computing device 200 is illustrated that may provide the operating-system-first error handling system of the present disclosure. In an embodiment, the computing device 200 may be provided by the IHS 100 discussed above with reference to FIG. 1 and/or may include some or all of the components of the IHS 100, and in specific examples may be provided by a server device, a desktop computing device, a laptop/notebook computing device, a table computing device, a mobile phone, and/or other computing devices that would be apparent to one of skill in the art in possession of the present disclosure. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a primary processing system (not illustrated, but which may include the processor 102 discussed above with reference to FIG. 1 such as, for example, a Central Processing Unit (CPU)) and a primary memory system (not illustrated, but which may include the memory 114 discussed above with reference to FIG. 1 such as, for example, Dynamic Random Access Memory (DRAM)) that is coupled to the primary processing system and that includes instructions that, when executed by the primary processing system, cause the primary processing system to provide an operating system engine 204 that is configured to provide an operating system and/or otherwise perform the functionality of the operating system engine, operating system subsystem, and/or computing device 200 discussed below. In some of the specific examples provided below, the operating system engine 204 is configured to provide an Operating-System-directed configuration and Power Management (OSPM) subsystem/sub-engine that is configured to perform one or more of the operations of the operating system engine 204 described below, although one of skill in the art in possession of the present disclosure will appreciate how the functionality described for the operating system engine 204 may be enabled in a variety of manners that will fall within the scope of the present disclosure as well.

In the specific examples provided below, the operating system engine 204 includes an error handling sub-engine 204a that is configured to perform the error handling operations of the operating system engine 204 described below, and that error handling sub-engine 204a may be provided an operating system Machine Check Exception (MCE) error handling sub-engine/subsystem, a Peripheral Component Interface express (PCIe) uncorrected error handling sub-engine/subsystem, and/or other error handling sub-engines/subsystems that one of skill in the art in possession of the present disclosure would recognize as providing for the error handling operations described below. Furthermore, the operating system engine 204 is also described as including an operating system (OS) error log 204b that one of skill in the art in possession of the present disclosure will appreciate may be used by an operating system provided by the operating system engine 204 to store an error record and/or other error information as described in further detail below.

The chassis 202 may also house a reserved memory subsystem 206 is that is coupled to the operating system engine 204 (e.g., via a coupling between the reserved memory subsystem 206 and the primary processing system) and that may be provided by Double Data Rate (DDR) memory subsystem that may be reserved as described below according to the Advanced Configuration and Power Interface (ACPI) standard, and used to store error handling information that is accessible by the operating system engine 204 to provide for the error handling operations described below. As will be appreciated by one of skill in the art in possession of the present disclosure, the reserved memory subsystem 206 may be included in the memory 114 discussed above with reference to FIG. 1, and may be accessible by both an operating system provided by the operating system engine 204, as well as by the BIOS provided by the BIOS engine 212 described in further detail below.

The chassis 202 may also house a Baseboard Management Controller (BMC) device 208 that one of skill in the art in possession of the present disclosure will recognize may provide an Out-Of-Band (OOB) management platform on the computing device 200 that may use resources that are separate from the computing device 200 and provide a browser-based and/or Command-Line Interface (CLI) for managing and monitoring the computing device 200. For example, the BMC device 208 may be provided by an integrated DELL® Remote Access Controller (iDRAC) device included in computing devices provided by DELL® Inc. of Round Rock, Texas, United States, and/or other BMC devices that would be apparent to one of skill in the art in possession of the present disclosure. As such, while not illustrated in the examples provided and described below, one of skill in the art in possession of the present disclosure will recognize that the BMC device 208 may include a communication system that may be coupled to a management network in order to enable any of the network-based management operations described below.

In the specific examples illustrated and described below, the BMC device 208 includes a management processing system (not illustrated, but which may be similar to the processor 102 discussed above with reference to FIG. 1) and a management memory system (not illustrated, but which may be similar to the memory 114 discussed above with reference to FIG. 1) that is coupled to the management processing system and that includes instructions that, when executed by the management processing system, cause the management processing system to provide a BMC engine 208a that is configured to perform the functionality of the BMC engine, BMC subsystem, and/or BMC device 208 discussed below. The BMC device 208 may also include a BMC storage system (not illustrated, but which may be similar to the storage 108 discussed above with reference to FIG. 1) that is coupled to the BMC engine 208a (e.g., via a coupling between the storage system and the management processing system) and that includes a BMC database 208b that is configured to store any of the information utilized by the BMC engine 208a discussed below.

The BMC device 208 also includes a shared memory subsystem 208c that may be provided by a persistent memory subsystem such as a Serial Peripheral Interface (SPI) memory subsystem, a Double Data Rate (DDR) memory subsystem, any of a variety of software-defined memory subsystems, and/or other memory subsystem that one of skill in the art in possession of the present disclosure would recognize may be shared with the operating system engine 204 (e.g., with an operating system provided by the operating system engine 204) as described below. To provide a specific example, the shared memory subsystem 208c may be configured as a Memory-Mapped Input/Output (MMIO) memory space, although one of skill in the art in possession of the present disclosure will appreciate how the shared memory subsystem may be shared with the operating system engine 204 to enable the functionality described below using a variety of techniques that will fall within the scope of the present disclosure as well. However, while a specific BMC device 208 has been illustrated and described, one of skill in the art in possession of the present disclosure will appreciate how the functionality of the BMC device 208 described below may be provided by other devices that are configured to operate similarly to the BMC device 200 while remaining within the scope of the present disclosure as well.

The chassis 202 may also house one or more computing components 210 that are coupled to the operating system engine 204 (e.g., via a coupling between the computing components 210 and the primary processing system) and that may be provided by PCIe components, processors, memory devices, and/or any other computing components that one of skill in the art in possession of the present disclosure would recognize as experiencing the errors that require the error handling operations described below.

The chassis 202 may also house a Basic Input/Output System (BIOS) processing system (not illustrated, but which may be similar to the processor 102 discussed above with reference to FIG. 1 and may be provided by any of a variety of BIOS firmware processing systems that would be apparent to one of skill in the art in possession of the present disclosure) and a BIOS memory system (not illustrated, but which may be similar to the memory 114 discussed above with reference to FIG. 1 and may be provided by any of a variety of BIOS firmware memory systems that would be apparent to one of skill in the art in possession of the present disclosure) that is coupled to the BIOS processing system and that includes instructions that, when executed by the BIOS processing system, cause the BIOS processing system to provide a BIOS engine 212 that is configured to perform the functionality of the BIOS engine, BIOS subsystem, and/or computing device 200 discussed below. While not illustrated or described in detail below, one of skill in the art in possession of the present disclosure will appreciate how a communication interface (e.g., an Intelligent Platform Management Interface (IPMI) Keyboard Controller Style (KCS) direct communication interface) may be provided between the BMC engine 208a and the BIOS engine 212 (e.g., between the BIOS processing system and the management processing system), as well as how the BMC engine 208a and the BIOS engine 212 may be configured to communicate asynchronously with each other via interrupts.

The chassis may also include a BIOS storage system (not illustrated, but which may be similar to the storage 108 discussed above with reference to FIG. 1 and may be provided by any of a variety of Non-Volatile Random Access Memory (NVRAM) subsystems known in the art) that is coupled to the BIOS engine 212 (e.g., via a coupling between the BIOS storage system and the BIOS processing system) and that includes a BIOS database 214 that is configured to store any of the information utilized by the BIOS engine 212 discussed below. As will be appreciated by one of skill in the art in possession of the present disclosure, the BIOS engine 212 may be configured to provide a BIOS that operates to perform hardware initialization for hardware in the computing device 200 during an initialization process (e.g., a boot process) for the computing device 200, runtime services for an operating system (e.g., provided by the operating system engine 204) and/or applications/programs in the computing devices, and/or other BIOS functionality that would be apparent to one of skill in the art in possession of the present disclosure. However, while described as providing a BIOS, one of skill in the art in possession of the present disclosure will appreciate how the BIOS engine 212 may be replaced by a Unified Extensible Firmware Interface (UEFI) engine provided according to the UEFI specification that defines an architecture of the platform firmware used for initializing the computing device 200 and its interface for interacting with the an operating system (e.g., provided by the operating system engine 204) in the computing device 200.

Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the operating-system-first error handling functionality discussed below, while remaining within the scope of the present disclosure as well.

Figure 3:
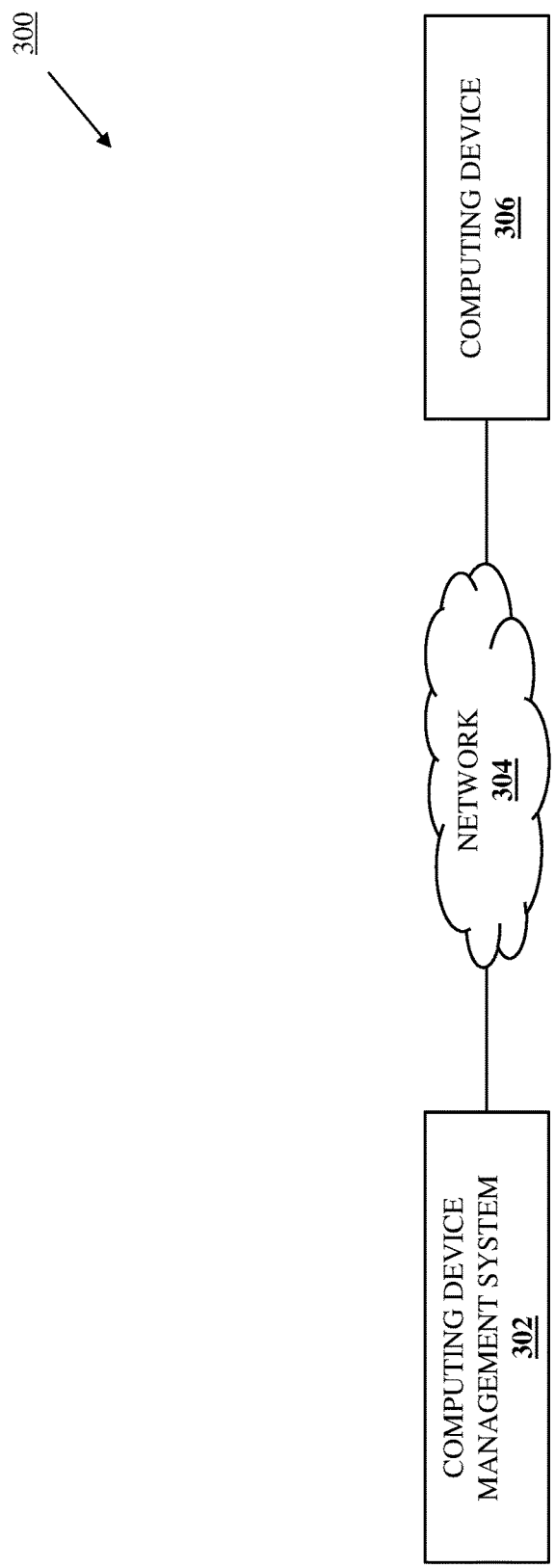
FIG. 3 is a schematic view illustrating an embodiment of a networked system that may include the operating-system-first error handling system of the present disclosure.

Referring now to FIG. 3, an embodiment of a networked system 300 is illustrated that may include the operating-system-first error handling system of the present disclosure. In the illustrated embodiment, the networked system 300 includes a computing device management system 302. In an embodiment, the computing device management system 302 may be provided by the IHS 100 discussed above with reference to FIG. 1, and/or may include some or all of the components of the IHS 100, and in specific examples may be provided by one or more server devices. However, while illustrated and discussed as being provided by server devices, one of skill in the art in possession of the present disclosure will recognize that device provided in the system 300 may include any devices that may be configured to operate similarly as the computing device management system 302 discussed below. To provide a specific example, the computing device management system 302 may be provided and/or controlled by a computing device provider such as DELL® Inc. of Round Rock, Texas, United States, and may be utilized to manage computing devices manufactured, sold, and/or otherwise provided by DELL® Inc. to customers. However, while a specific example of the computing device management system 302 has been provided, one of skill in the art in possession of the present disclosure will appreciate how a variety of implementations of the computing device management system 302 will fall within the scope of the present disclosure as well.

In the illustrated embodiment, the computing device management system 302 is coupled to a network 304 that may be provided by a Local Area Network (LAN), the Internet, combinations thereof, and/or any other network that would be apparent to one of skill in the art in possession of the present disclosure. As illustrated, a computing device 306 is coupled via the network 304 to the computing device management system 302, and may be provided by the computing device 200 discussed above with reference to FIG. 2. However, while a specific networked system 200 has been illustrated and described, one of skill in the art in possession of the present disclosure will recognize that the operating-system-first error handling system of the present disclosure may be provided in a variety of networked systems while remaining within the scope of the present disclosure as well.

Figure 4:
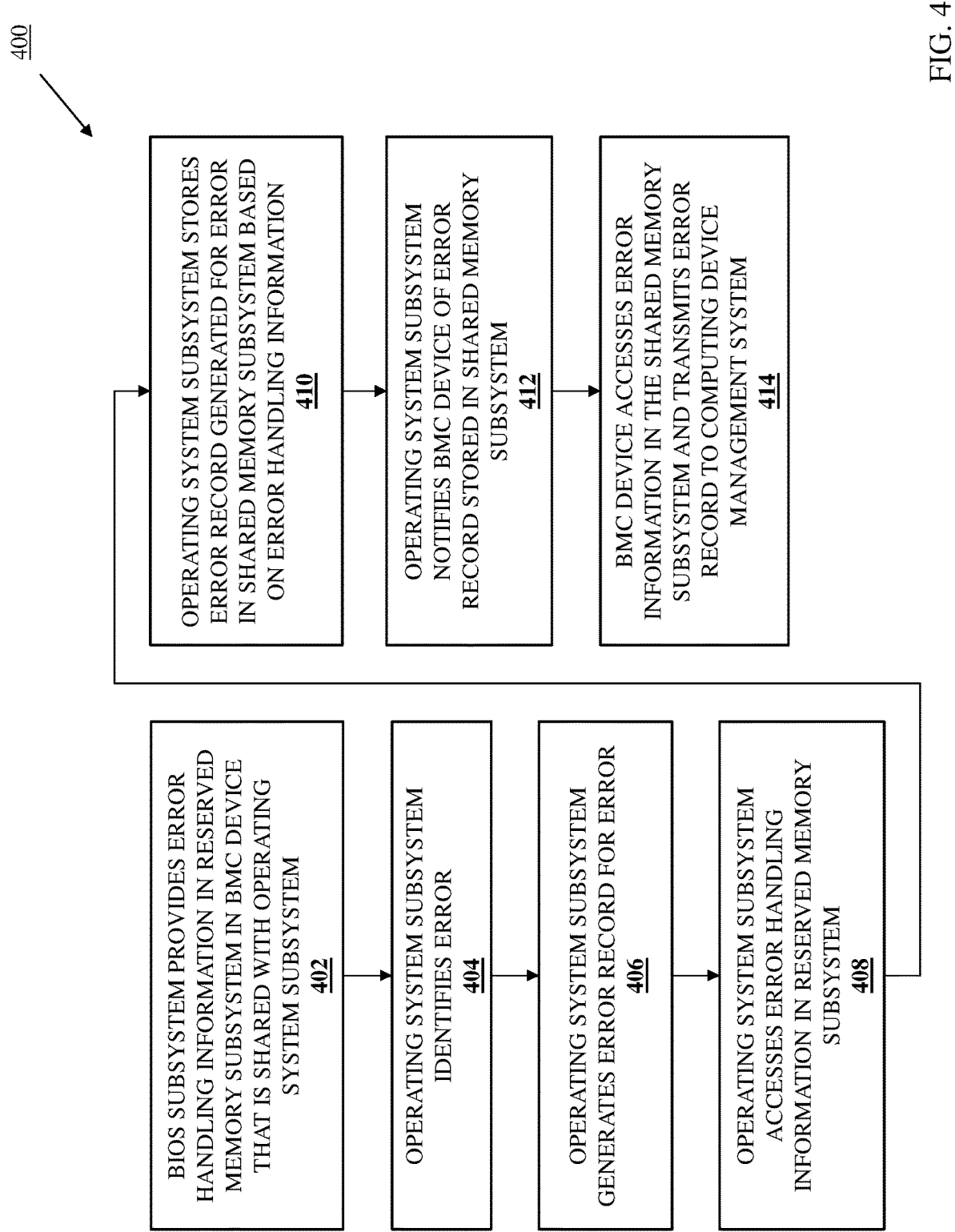
FIG. 4 is a flow chart illustrating an embodiment of a method for handling errors in a computing device.

Referring now to FIG. 4, an embodiment of a method 400 for handling errors in a computing device is illustrated. As discussed below, the systems and methods of the present disclosure provide for the handling of errors by an operating system in a manner that eliminates SMI and SMM operations performed by conventional firmware-first error handling models while also making error information available to computing device management systems. For example, the operating-system-first error handling system of the present disclosure may include an operating system subsystem coupled to a BMC device including a shared memory subsystem, and to a reserved memory subsystem storing error handling information that is configured to direct the storage of error information in the shared memory subsystem in the BMC device. The operating system subsystem identifies a first error and generates first error information for the first error. The operating system subsystem then accesses the error handling information and, based on the error handling information, stores the first error information generated for the first error in the shared memory subsystem included in the BMC device. The operating system subsystem then notifies the BMC device of the first error information stored in the shared memory subsystem. The BMC device may then access the first error information in the shared memory subsystem and transmit the first error information to a computing device management system. As such, the issues associated with the conventional firmware-first handling models and conventional operating-system-first error handling models described above are eliminated.

Figure 5:
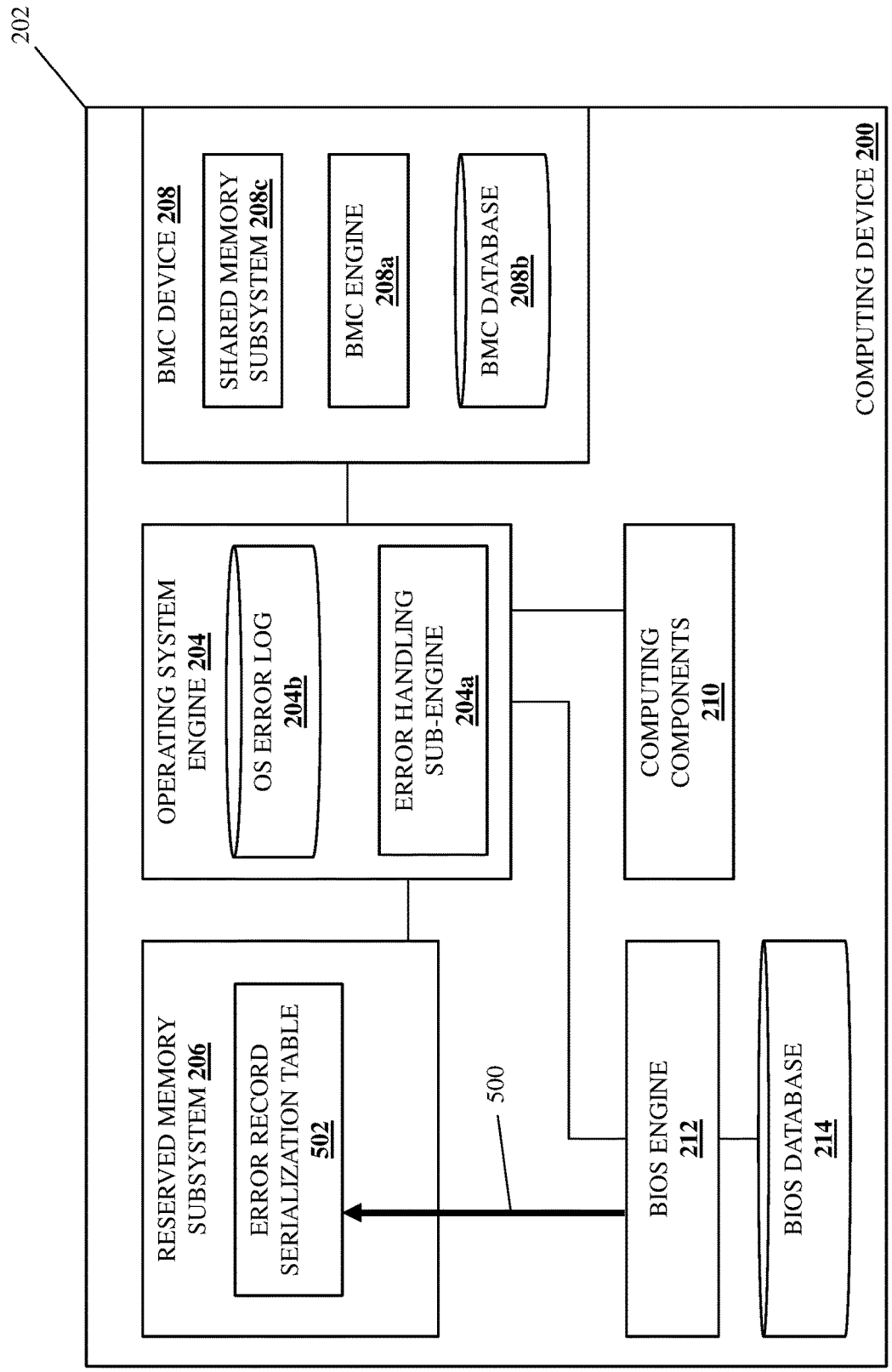
FIG. 5 is a schematic view illustrating an embodiment of the computing device of FIG. 2 operating during the method of FIG. 4.

The method 400 begins at block 402 where a BIOS subsystem provides error handling information in a reserved memory subsystem in a BMC device that is shared with an operating system subsystem. With reference to FIG. 5, in an embodiment of block 402, the BIOS engine 212 may perform error handling information provisioning operations 500 that may include providing error handling information in the reserved memory subsystem 206. For example, during an initialization process (e.g., a Power-On Start-Up (POST)) for the computing device 200, the BIOS provided by the BIOS engine 212 may reserve a portion of the reserved memory subsystem 206 (e.g., for use as a memory-based "mailbox" as described below), may generate an Error Record Serialization Table (ERST) 502 that includes error handling information that is configured to direct the storage of an error record and/or other error information in the shared memory subsystem 208c included in the BMC device 208, and may "publish" or otherwise provide the ERST 502 in the reserved portion of the reserved memory subsystem 206. However, while specific error handling information has been described, one of skill in the art in possession of the present disclosure will appreciate how other error handling information will fall within the scope of the present disclosure as well.

As will be appreciated by one of skill in the art in possession of the present disclosure, the conventional firmware-first error handling models described above may utilize a ERST provided by a BIOS. For example, in such conventional firmware-first error handling models, an operating system may detect an error, generate an error record for that error, and then access the ERST provided by the BIOS to retrieve ERST error handling instructions (e.g., instructions for generating "save error record" requests and "get error record" requests) that point to a UEFI variable store in a BIOS SPI memory subsystem and cause the operating system to access a processor in a manner (e.g., via an Input/Output (IO) port and/or hardware register) that causes the SMI and corresponding SMM discussed above during which the BIOS stores the error record in the BIOS SPI memory subsystem. However, as described below, the ERST 502 generated by the BIOS in the operating-system-first error handling system of the present disclosure includes ERST error handling instructions (e.g., instructions to provide "save error record" requests and "get error record" requests in which the BIOS has replaced conventional action instructors with action instructors that provide for the utilization of the shared memory subsystem 208c in the BMC device 208) that cause the operating system to store error records and other error information in the shared memory subsystem 208c in the BMC device 208, thus avoiding the use of the SMI and SMM utilized in the conventional firmware-first error handling models and their associated security issues and performance degradation.

Figure 6:
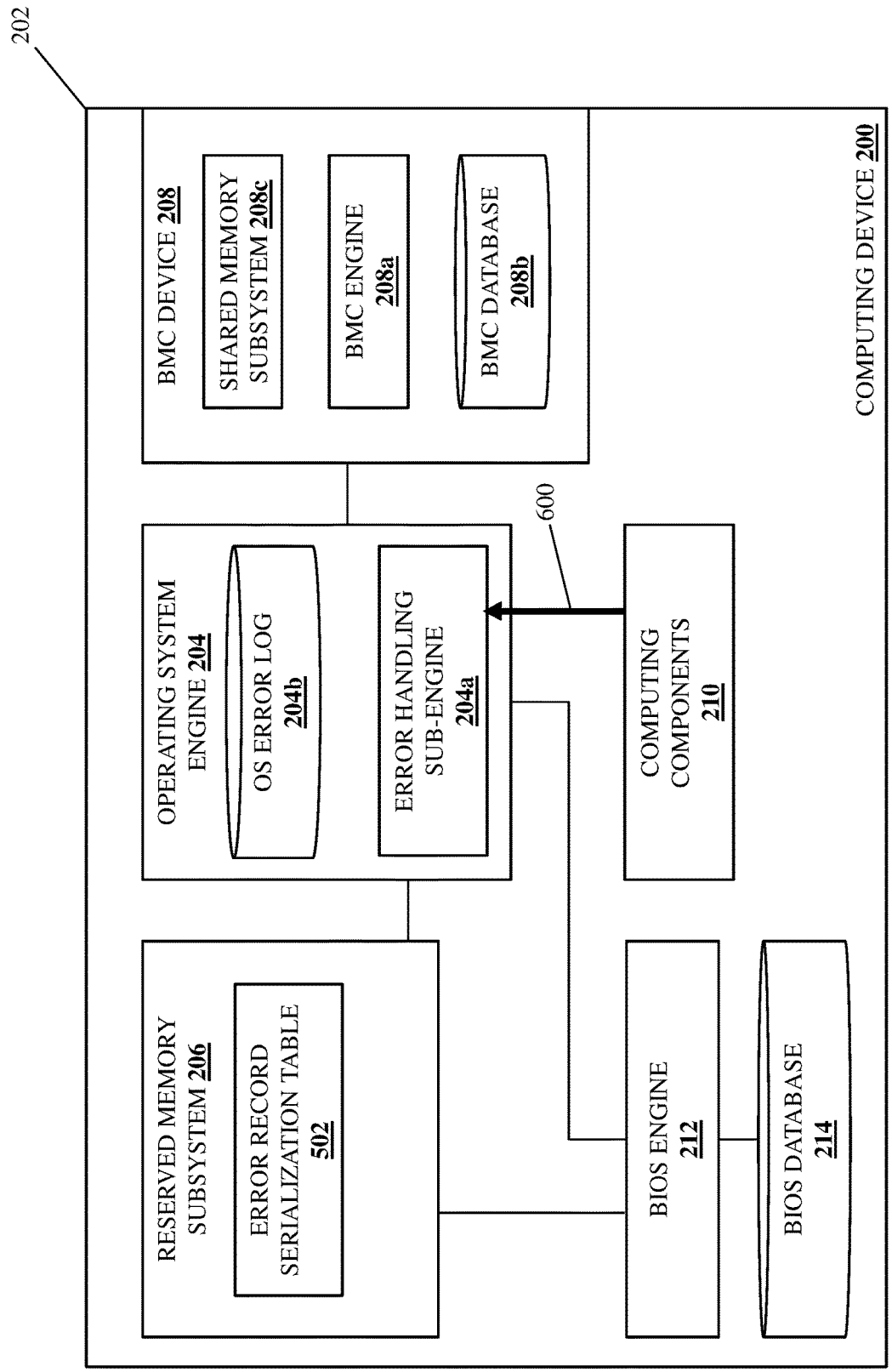
FIG. 6 is a schematic view illustrating an embodiment of the computing device of FIG. 2 operating during the method of FIG. 4.

The method 400 then proceeds to block 404 where an operating system subsystem identifies an error. With reference to FIG. 6, in an embodiment of block 404, the error handling sub-engine 204a in the operating system engine 204 may perform error identification operations 600 that may include identifying any error that occurs in any of the computing components 210. For example, subsequent to the provisioning of the ERST 502 in the reserved memory subsystem 206 (e.g., during the remaining initialization of the computing device 200, following that initialization and during runtime of the computing device 200, etc.), any of the computing components 210 may experience an error, and one of skill in the art in possession of the present disclosure will recognize how an MCE error handling subsystem, a PCIe uncorrected error handling subsystem, and/or other error handling subsystem in the operating system provided by the operating system engine 204 may identify that error using any of a variety of error identification techniques known in the art.

The method 400 then proceeds to block 406 where the operating system subsystem generates an error record for the error. In an embodiment, at block 406 and in response to identifying the error at block 404, the error handling sub-engine 204a included in the operating system engine 204 may generate an error record that may include a UEFI Common Platform Error Record (CPER) format, and that may identify a Peripheral Component Interconnect address (e.g., via Bus, Device, Function (BDF) information) of a device experiencing the error, a manufacturer code for the device experiencing the error, a device code for the device experiencing the error, one or more values of supporting PCIe registers that describe the nature, origin, and/or other information about the error experienced by the device, and/or any other error information that would be apparent to one of skill in the art in possession of the present disclosure. However, while specific error information has been described, one of skill in the art in possession of the present disclosure will appreciate how a variety of error information will fall within the scope of the present disclosure as well.

Figure 7:
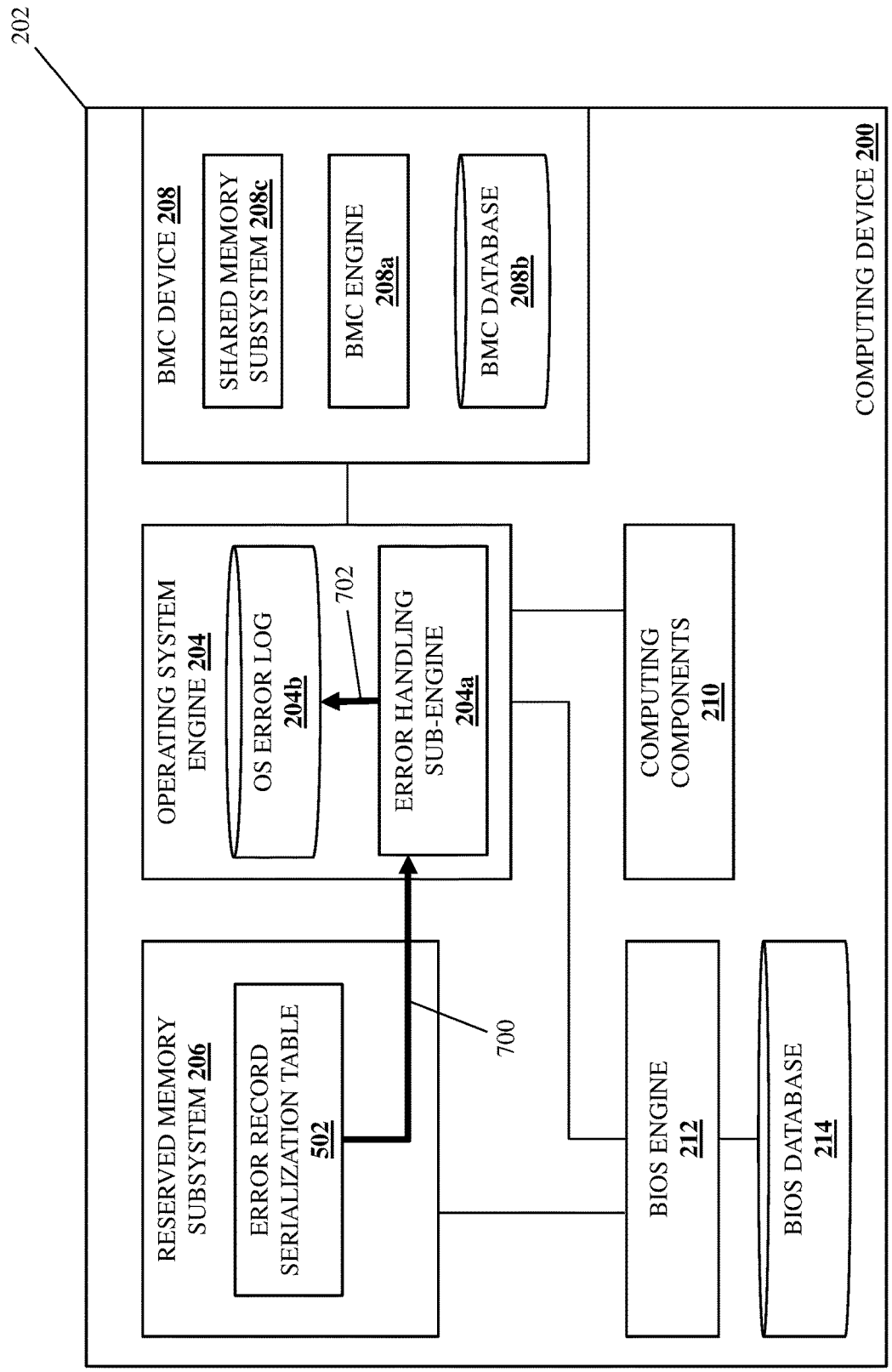
FIG. 7 is a schematic view illustrating an embodiment of the computing device of FIG. 2 operating during the method of FIG. 4.

The method 400 then proceeds to block 408 where the operating system subsystem accesses error handling information in the reserved memory subsystem. With reference to FIG. 7, in an embodiment of block 408 and subsequent to generating the error record and/or other error information, the error handling sub-engine 204a included in the operating system engine 204 may perform error handling information access operations 700 that include accessing ERST 502 in the reserved memory subsystem 206 and retrieving the ERST error handling instructions discussed above that are configured to provide for the storage of the error record and/or other error information in the shared memory subsystem 208c in the BMC device 208. As illustrated in FIG. 7, in some embodiments the error handling sub-engine 204a included in the operating system engine 204 may perform error record operating system storage operations 702 that include storing the error record and/or other error information generated at block 406 for the error identified at block 404 in the OS error log 204b, and as discussed above the storage of the error record and/or other error information in the OS error log 204b will render that error record and/or other error information inaccessible or otherwise unavailable to the computing device management system 302 discussed above with reference to FIG. 3.

Figure 8:
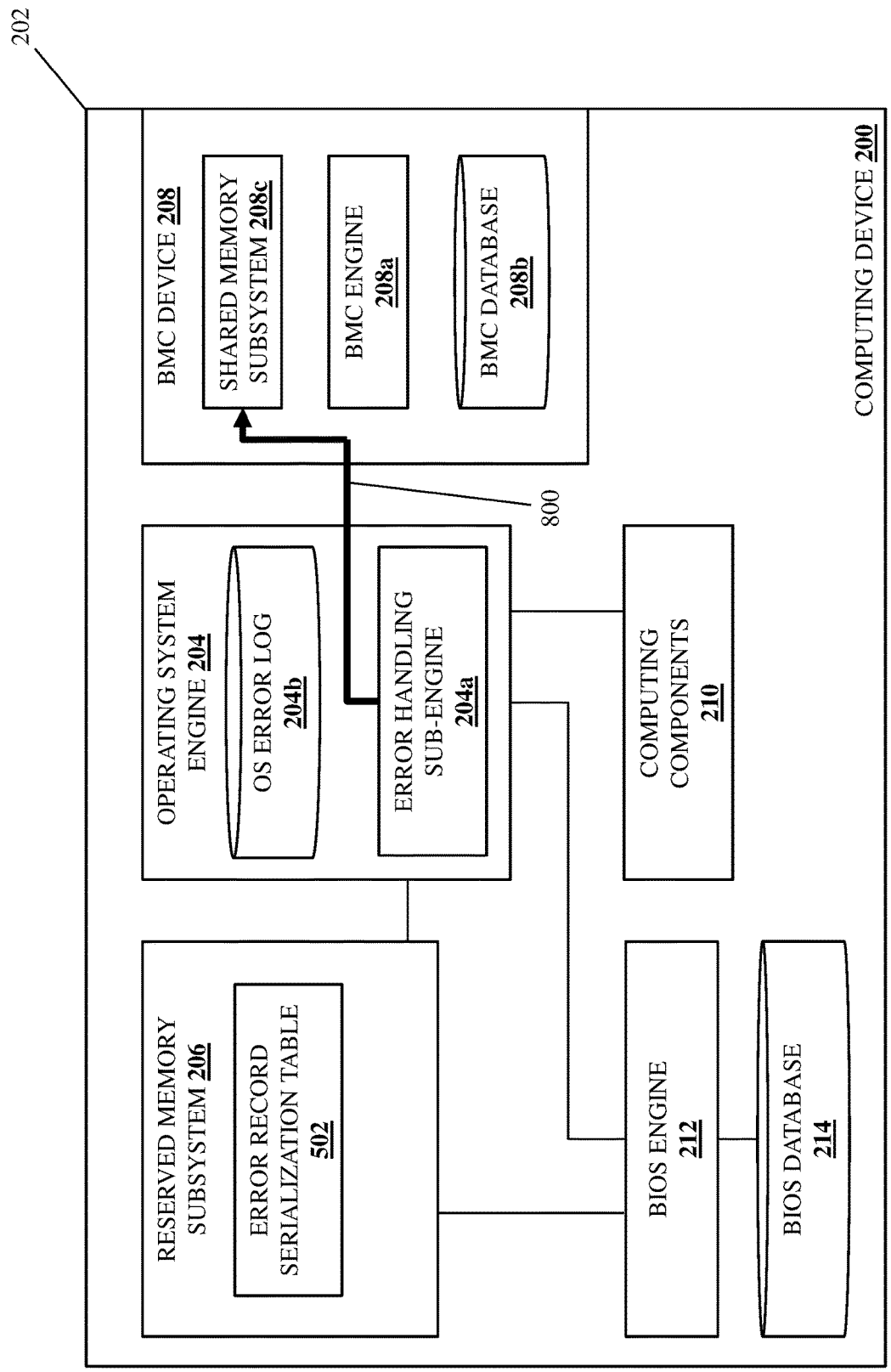
FIG. 8 is a schematic view illustrating an embodiment of the computing device of FIG. 2 operating during the method of FIG. 4.

The method 400 then proceeds to block 410 where the operating system subsystem stores the error record generated for the error in the shared memory subsystem based on the error handling information. With reference to FIG. 8, in an embodiment of block 410, the error handling sub-engine 204a included in the operating system engine 204 may perform error record BMC device storage operations 800 that include storing the error record and/or other error information generated at block 406 for the error identified at block 404 in the shared memory subsystem 208c in the BMC device 208 as instructed by the ERST instructions retrieved from the ERST 502 at block 408.

Figure 9:
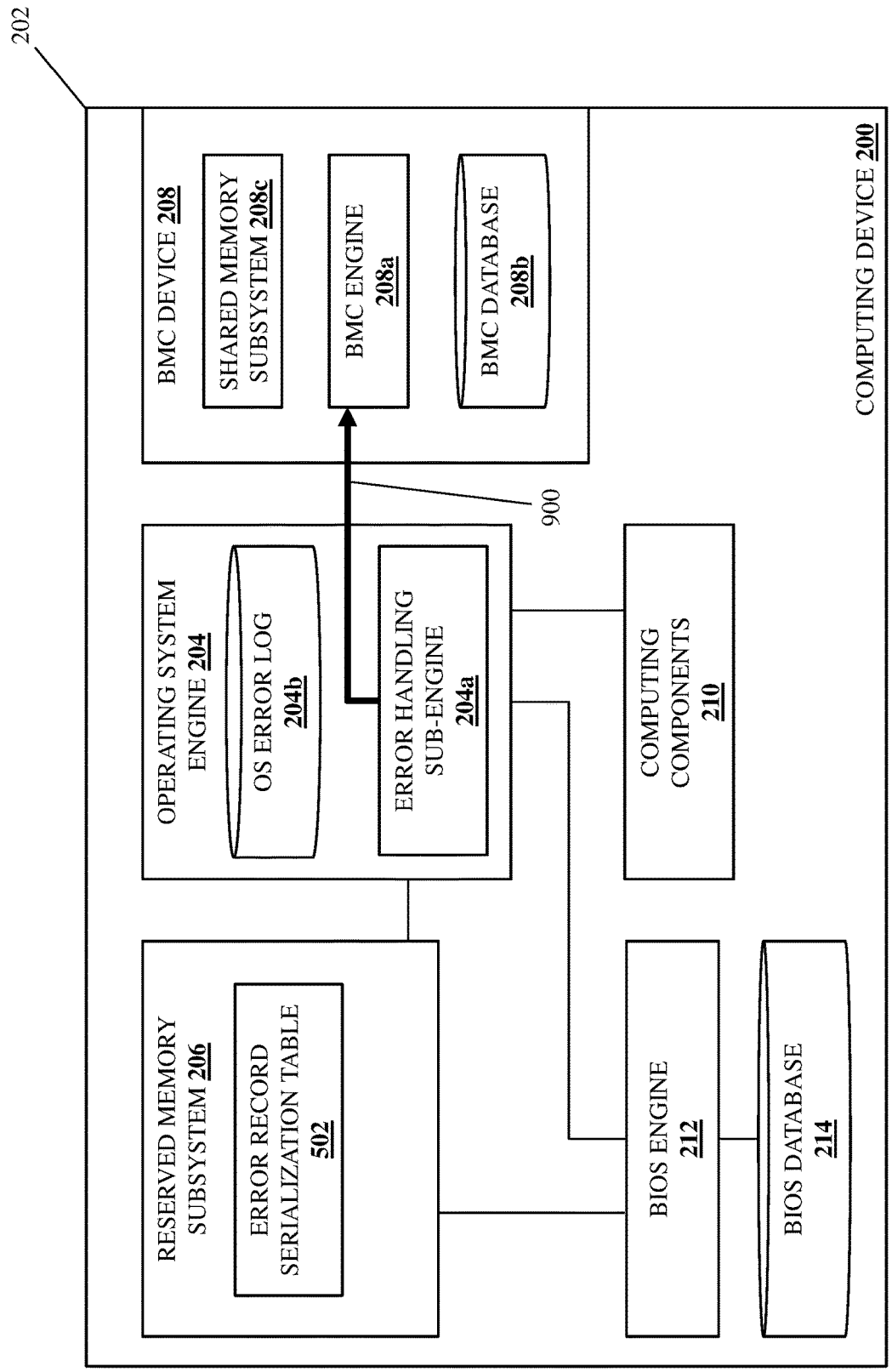
FIG. 9 is a schematic view illustrating an embodiment of the computing device of FIG. 2 operating during the method of FIG. 4.

The method 400 then proceeds to block 412 where the operating system subsystem notifies the BMC device of the error record stored in the shared memory subsystem. With reference to FIG. 9, in an embodiment of block 412 and following the storing of the error record and/or other error information in the shared memory subsystem 208c of the BMC device 208, the error handling sub-engine 204a in the operating system engine 204 may perform error record notification operations 900 that include generating and transmitting a BMC interrupt, "mailbox traffic", and/or other notification to the BMC engine 208a in the BMC device 208 in order to notify the BMC engine 208a of the error record and/or other error information stored in the shared memory system 208c. As will be appreciated by one of skill in the art in possession of the present disclosure, the notification provided at block 412 (e.g., a BMC interrupt) will not interrupt the operation of the operating system provided by the operating system engine 204 and cause the performance degradation associated with the SMI and SMM utilized in conventional firmware-first error handling models described above, as the operating system provided by the operating system engine 204 may generate the BMC interrupt and then continue operating system operations without having to pause or otherwise wait for any associated error handling operations to complete.

Figure 10:
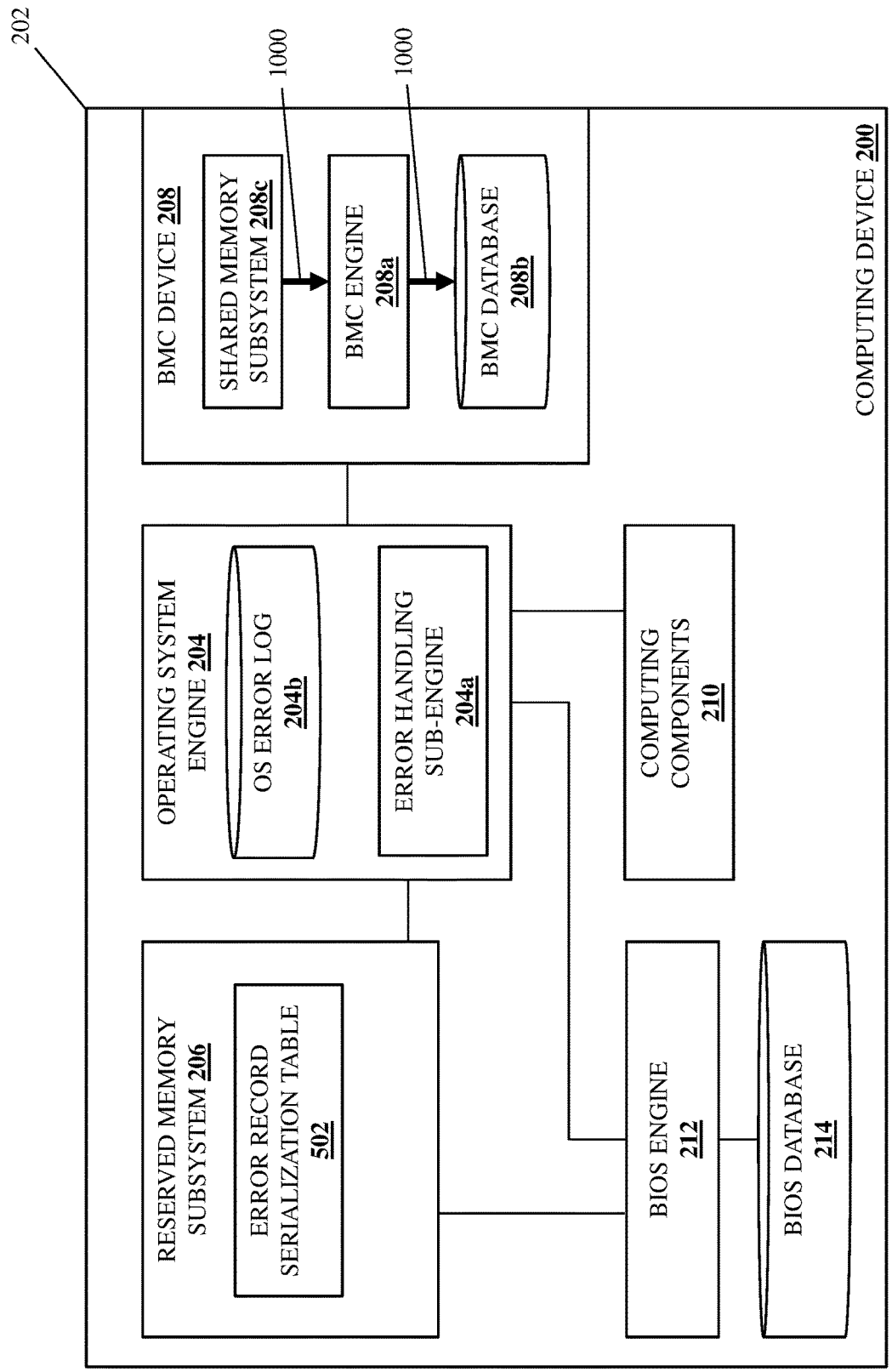
FIG. 10 is a schematic view illustrating an embodiment of the computing device of FIG. 2 operating during the method of FIG. 4.

The method 400 then proceeds to block 414 where the BMC device accesses the error record in the shared memory subsystem and transmits the error record to a computing device management system. With reference to FIG. 10, in an embodiment of block 414 and in response to being notified of the error record and/or other error information in the shared memory subsystem 208c, the BMC engine 208a may perform error record storage operations 1000 that include accessing the error record and/or other error information in the shared memory subsystem 208c and storing that error record and/or other error information in the BMC database 208b. For example, at block 414, the BMC engine 208a may retrieve the error record and/or other error information from the shared memory subsystem 208c and provide it in a Technical Support Register (TSR) that is stored in the BMC database 208b, provide it for storage in a manner that makes that error record and/or other error information available for REDFISH® log presentation operations, and/or perform any other error storage operations that would be apparent to one of skill in the art in possession of the present disclosure.

In some embodiments, the BMC engine 208a may operate at block 414 to supplement the error record and/or other error information retrieved from the shared memory subsystem 208c. For example, the error record and/or other error information stored by the operating system engine 204 in the shared memory subsystem 208c may not identify the computing component 210 that generated the error that resulted in that error record and/or other error information, and rather may only report an address associated with that computing component. In such situations, the BMC engine 208a may access a computing component/address mapping (e.g., a Field Replaceable Unit (FRU)/address mapping) to identify a computing component (e.g., an FRU) that is associated with an address identified in the error record and/or other error information, and then supplement that error record and/or other error information with information about that computing component (e.g., an FRU identifier for the FRU) in order to provide, for example, for the replacement of that computing component (e.g., replacement of an FRU).

As will be appreciated by one of skill in the art in possession of the present disclosure, in conventional firmware-first error handling models in which the BIOS stores error records in its NVRAM subsystem, the provisioning of those error records to a BMC device is a relatively slow process due to the relatively slow communication coupling between the BIOS and the BMC device, and operates to exacerbate the latency issues discussed above with regard to SMIs and the SMM. However, one of skill in the art in possession of the present disclosure will appreciate how the BMC interrupt by the operating system engine 204 at block 412 and subsequent error handling by the BMC engine 208a at block 414 eliminates such issues by eliminating the use of the SMI and SMM that introduce such latency.

Figure 11A:
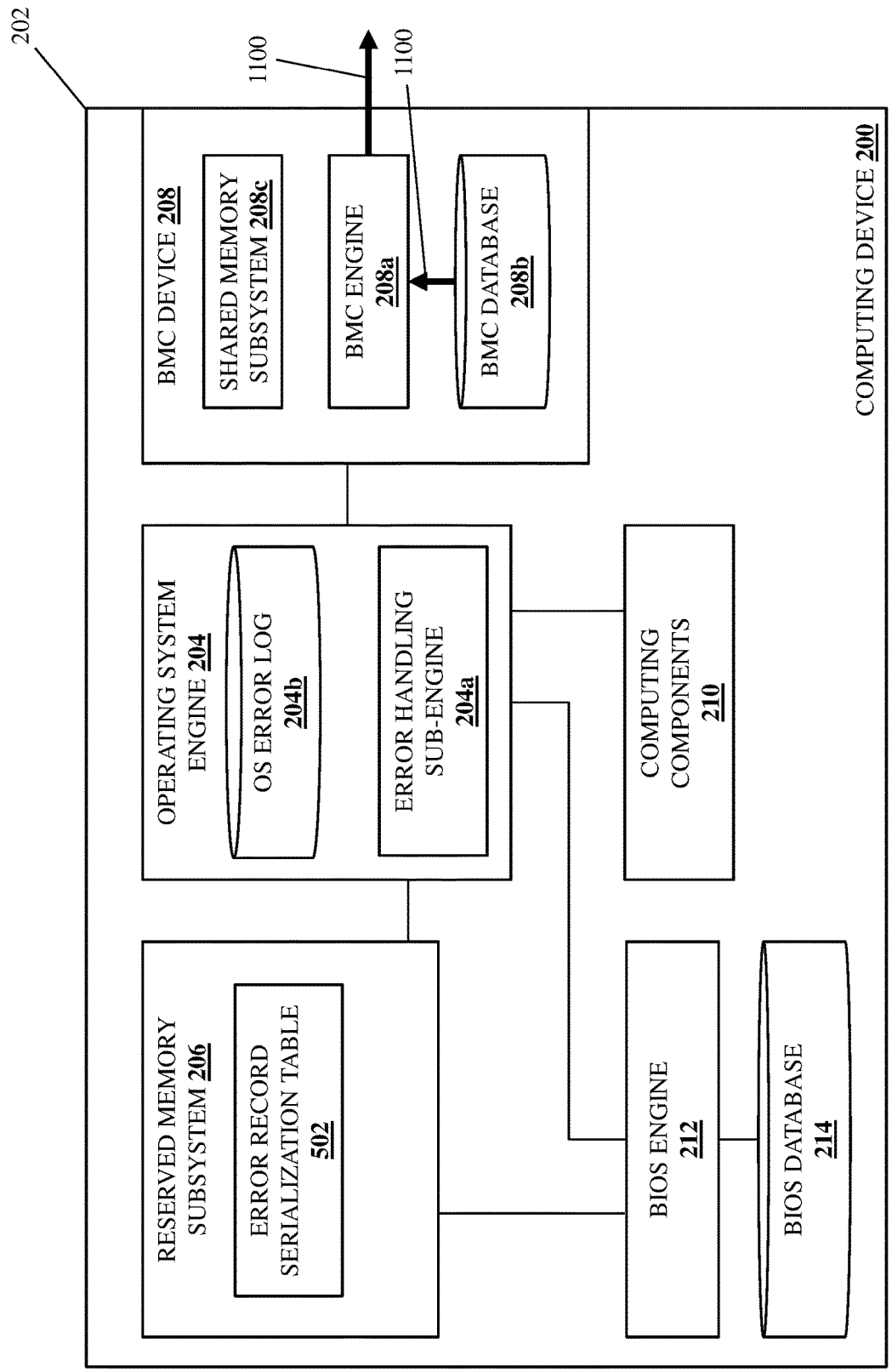
FIG. 11A is a schematic view illustrating an embodiment of the computing device of FIG. 2 operating during the method of FIG. 4.
Figure 11B:
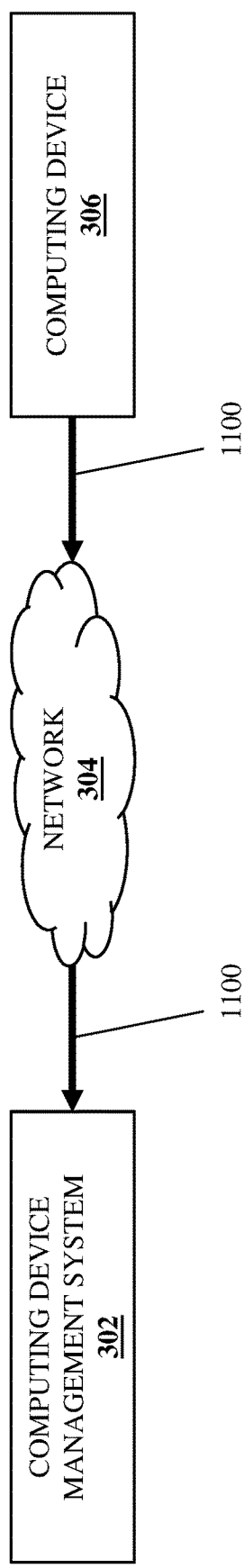
FIG. 11B is a schematic view illustrating an embodiment of the networked system of FIG. 3 operating during the method of FIG. 4.

With reference to FIGS. 11A and 11B, in an embodiment of block 414, the BMC engine 208a in the BMC device 208 may perform error handling information transmission operations 1100 that include transmitting the error record and/or other error information from the BMC database 208b and via the network 304 to the computing device management system 302. As such, one of skill in the art in possession of the present disclosure will appreciate how the storage of the error handling information in the BMC database 208b/BMC device 208 (e.g., in a BMC error log) allows the computing device management system 302 access to that error record and/or other error information (e.g., as opposed to the inaccessible/unavailable error record and/or other error information stored in the OS error log 204b as described above), and thus enables associated management, support, servicing, warrantying, and/or other operations that one of skill in the art in possession of the present disclosure would recognize as being enabled via access to the error record and/or other error information for the errors occurring in the computing device 200.

Thus, systems and methods have been described that provide for the handling of errors by an operating system in a manner that eliminates SMI and SMM operations performed by conventional firmware-first error handling models while also making error information available to computing device management systems. For example, the operating-system-first error handling system of the present disclosure may include an operating system subsystem coupled to a BMC device including a shared memory subsystem, and to a reserved memory subsystem storing error handling information that is configured to direct the storage of error information in the shared memory subsystem in the BMC device. The operating system subsystem identifies a first error and generates first error information for the first error. The operating system subsystem then accesses the error handling information and, based on the error handling information, stores the first error information generated for the first error in the shared memory subsystem included in the BMC device. The operating system subsystem then notifies the BMC device of the first error information stored in the shared memory subsystem. The BMC device may then access the first error information in the shared memory subsystem and transmit the first error information to a computing device management system. As such, the issues associated with the conventional firmware-first handling models and conventional operating-system-first error handling models described above are eliminated.

However, one of skill in the art in possession of the present disclosure will appreciate how both conventional operating-system-first error handling systems and the operating-system-first error handling systems of the present disclosure described above do not provide for the handling of errors that occur during initialization of their computing device, and thus hardware instability and/or other error generation issues that occur during initialization of that computing device will not be detected and recorded and may simply result in that computing device "hanging" or otherwise becoming unavailable. Furthermore, the variety of operating systems used with computing devices and their associated error messages can present difficulties to the computing device management systems described above, as the computing device management system may not recognize error messages and/or may not agree with a severity or cause of an error message, any of which can prevent or delay the replacement of components in the computing device by computing device management systems that rely on firmware-first error handling (e.g., BIOS error handling by a BIOS that is controlled and standardized by the computing device management system) to create component/computing device lifecycle records that authorize component replacement. As such, the inventors of the present disclosure have developed a hybrid firmware-first/operating-system-first error handling system that addresses the issues discussed above.

Figure 12:
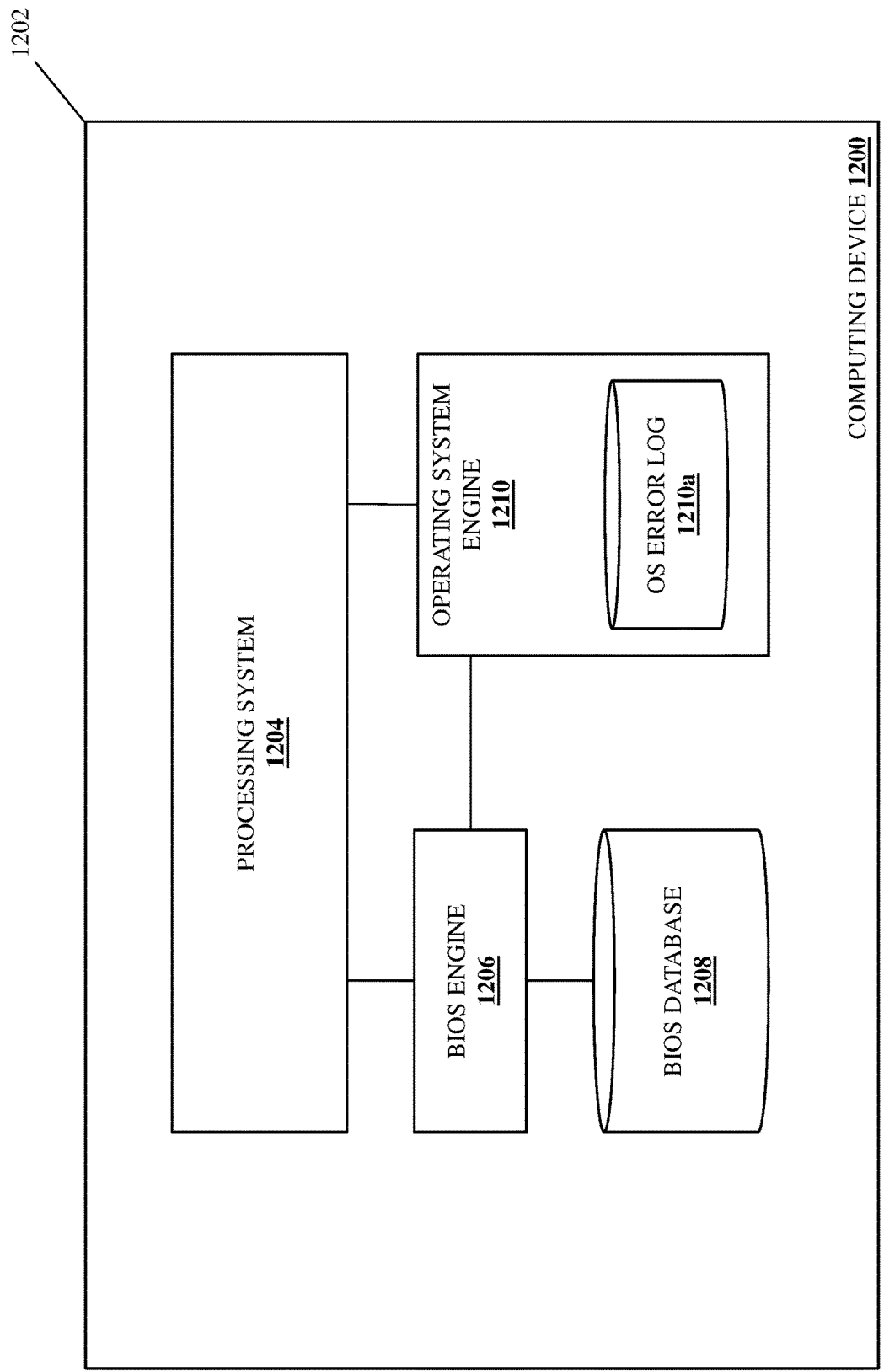
FIG. 12 is a schematic view illustrating an embodiment of a computing device that may include the hybrid firmware-first/operating-system-first error handling system of the present disclosure.

Referring now to FIG. 12, a computing device 1200 is illustrated that may include the hybrid firmware-first/operating-system-first error handling system of the present disclosure, and one of skill in the art in possession of the present disclosure will appreciate how the computing device 1200 may provide an embodiment of the computing device 200 discussed above with reference to FIG. 2 (e.g., components and/or functionality described for either of the computing devices 200 and 1200 may be provided in either of the computing devices 200 and 1200). In an embodiment, the computing device 1200 may be provided by the IHS 100 discussed above with reference to FIG. 1 and/or may include some or all of the components of the IHS 100, and in specific examples may be provided by a server device, a desktop computing device, a laptop/notebook computing device, a table computing device, a mobile phone, and/or other computing devices that would be apparent to one of skill in the art in possession of the present disclosure. Furthermore, while illustrated and discussed as being provided by particular computing devices, one of skill in the art in possession of the present disclosure will recognize that the functionality of the computing device 1200 discussed below may be provided by other devices that are configured to operate similarly as the computing device 1200 discussed below.

In the illustrated embodiment, the computing device 1200 includes a chassis 1202 that houses the components of the computing device 1200, only some of which are illustrated and described below. For example, in the illustrated embodiment the chassis 1202 houses a processing system 1204 that is described below as being provided by a primary processing system that may be provided by a Central Processing Unit (CPU) and/or other primary processing systems that would be apparent to one of skill in the art in possession of the present disclosure.

The chassis 202 may also house a Basic Input/Output System (BIOS) processing system (not illustrated, but which may be similar to the processor 102 discussed above with reference to FIG. 1 and may be provided by any of a variety of BIOS firmware processing systems that would be apparent to one of skill in the art in possession of the present disclosure) and a BIOS memory system (not illustrated, but which may be similar to the memory 114 discussed above with reference to FIG. 1 and may be provided by any of a variety of BIOS firmware memory systems that would be apparent to one of skill in the art in possession of the present disclosure) that is coupled to the BIOS processing system and that includes instructions that, when executed by the BIOS processing system, cause the BIOS processing system to provide a BIOS engine 1206 that is configured to perform the functionality of the BIOS engines, BIOS subsystems, and/or computing device 200 discussed below. As will be appreciated by one of skill in the art in possession of the present disclosure, in some embodiments the BIOS engine 1206 described below may provide the BIOS engine 212 discussed above (e.g., the functionality of the BIOS engine 1206 described below may be provided in the BIOS engine 212) while remaining within the scope of the present disclosure.

The chassis may also include a BIOS storage system (not illustrated, but which may be similar to the storage 108 discussed above with reference to FIG. 1 and may be provided by any of a variety of Non-Volatile Random Access Memory (NVRAM) subsystems know in the art) that is coupled to the BIOS engine 1206 (e.g., via a coupling between the BIOS storage system and the BIOS processing system) and that includes a BIOS database 1208 that is configured to store any of the information utilized by the BIOS engine 1206 discussed below. As will be appreciated by one of skill in the art in possession of the present disclosure, in some embodiments the BIOS database 1208 described below may provide the BIOS database 214 discussed above (e.g., information stored in the BIOS database 1208 described below may be stored in the BIOS database 214) while remaining within the scope of the present disclosure.

Similarly as discussed above for the BIOS engine 212/BIOS database 214, the BIOS engine 1206 may be configured to provide a BIOS that operates to perform hardware initialization for hardware in the computing device 1200 during an initialization process (e.g., a boot process) for the computing device 1200, runtime services for an operating system (e.g., provided by the operating system engine 1210 described below) and/or applications/programs in the computing devices, and/or other BIOS functionality that would be apparent to one of skill in the art in possession of the present disclosure. However, while described as providing a BIOS, one of skill in the art in possession of the present disclosure will appreciate how the BIOS engine 1206 may be replaced by a Unified Extensible Firmware Interface (UEFI) engine provided according to the UEFI specification that defines an architecture of the platform firmware used for initializing the computing device 1200 and its interface for interacting with an operating system (e.g., provided by the operating system engine 1210 discussed below) in the computing device 1200.

In the illustrated embodiment, the computing device 1200 may house a primary memory system (not illustrated, but which may include the memory 114 discussed above with reference to FIG. 1 such as, for example, Dynamic Random Access Memory (DRAM)) that is coupled to the processing system 1204 and that includes instructions that, when executed by the processing system 1204, cause the processing system 1204 to provide an operating system engine 1210 that is configured to provide an operating system and/or otherwise perform the functionality of the operating system engines, operating system subsystems, and/or computing device 200 discussed below. Furthermore, the operating system engine 1210 is also illustrated as including an operating system (OS) error log 1210a that one of skill in the art in possession of the present disclosure will appreciate may be used by an operating system provided by the operating system engine 1210 to store an error record and/or other error information as described in further detail below. As will be appreciated by one of skill in the art in possession of the present disclosure, in some embodiments the operating system engine 1210/operating system error log 1210a described below may provide the operating system engine 204/operating system error log 204b discussed above (e.g., functionality of the operating system engine 1210 described below may be provided in the operating system engine 204 and/or information stored in the operating system error log 1210a described below may be stored in the operating system error log 204b) while remaining within the scope of the present disclosure.

Furthermore, while a specific computing device 1200 has been illustrated and described, one of skill in the art in possession of the present disclosure will recognize that computing devices (or other devices operating according to the teachings of the present disclosure in a manner similar to that described below for the computing device 1200) may include a variety of components and/or component configurations for providing conventional computing device functionality, as well as the hybrid firmware-first/operating-system-first error handling functionality discussed below, while remaining within the scope of the present disclosure as well.

Figure 13A:
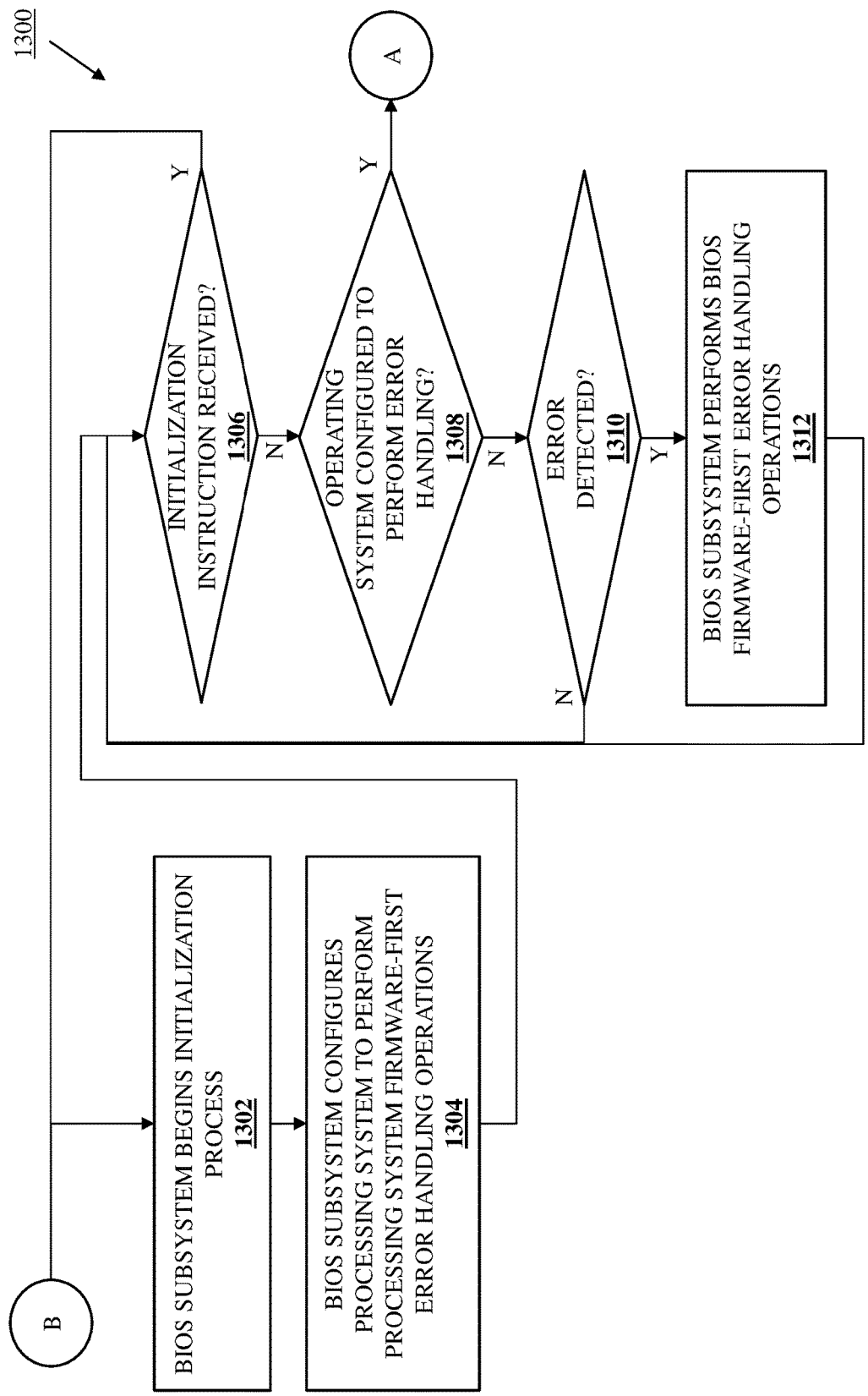
FIGS. 13A and 13B are a flow chart illustrating an embodiment of a method for handling errors in a computing device.
Figure 13B:
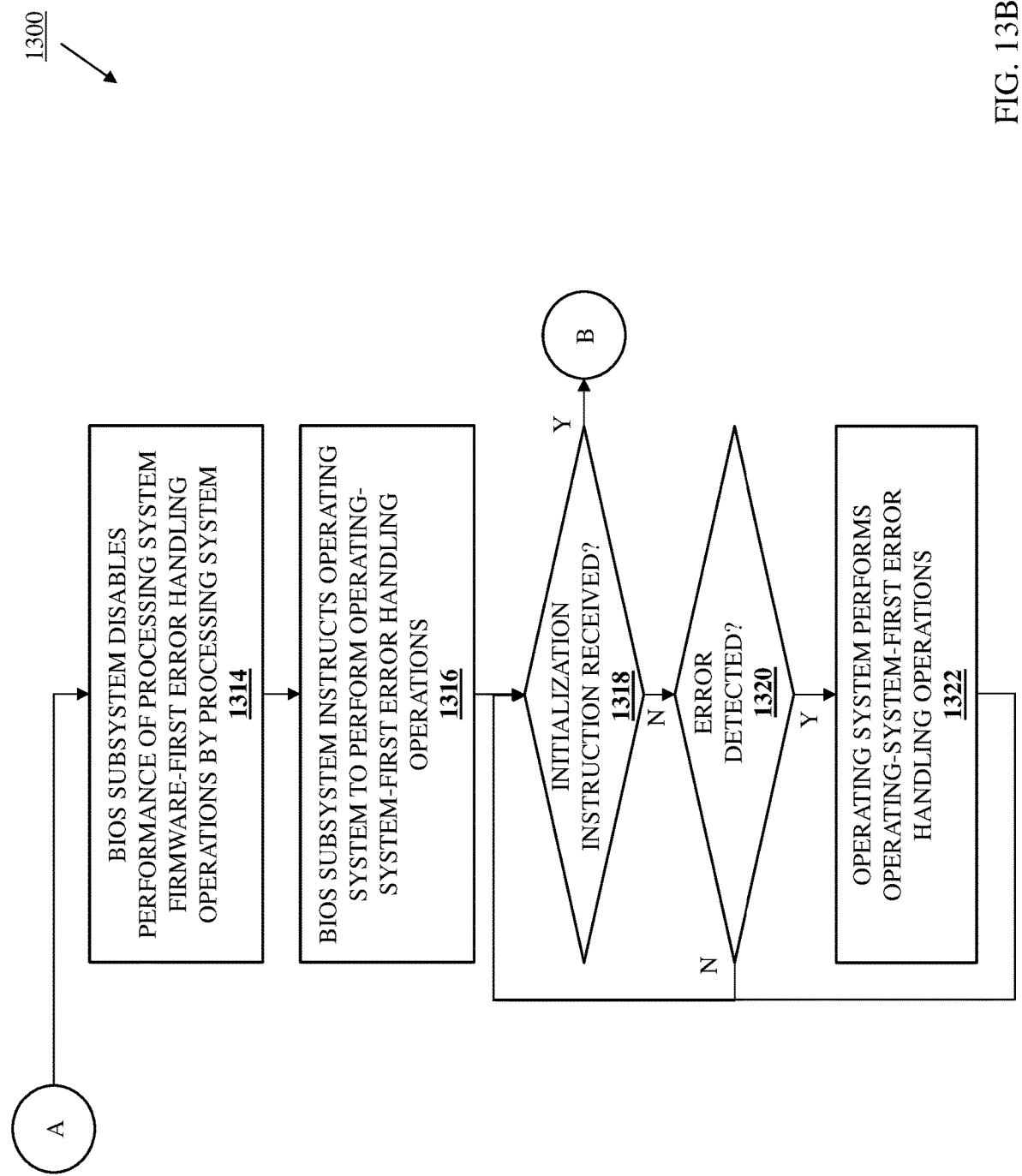

Referring now to FIGS. 13A and 13B, an embodiment of a method 1300 for handling errors in a computing device is illustrated. As discussed below, the systems and methods of the present disclosure provide for firmware-first error handling operations during initialization of a computing device, and operating-system-first error handling during runtime of the computing device. For example, the hybrid firmware-first/operating-system-first error handling system of the present disclosure may include a Basic Input/Output System (BIOS) subsystem coupled to a processing system. The BIOS subsystem begins an initialization process for a computing device and, in response, configures the processing system to perform processing system firmware-first error handling operations and, for any errors that are detected during at least a portion of the initialization process, performs BIOS firmware-first error handling operations. During the initialization process, the BIOS subsystem determines that an operating system provided by the processing system is configured to perform error handling and, in response, disables the performance of processing system firmware-first error handling operations by the processing system, and instructs the operating system to perform operating-system-first error handling operations such that the operating system performs the operating-system-first error handling operations for any errors that are detected during runtime of the computing device. As such, error handling during initialization of computing devices that utilize operating-system-first error handling models is enabled, addressing the computing device management issues with computing devices that utilize operating-system-first error handling models discussed above.

The method 1300 begins at block 1302 where a BIOS subsystem begins an initialization process. In an embodiment, at block 1302, the computing device 1200 may be powered on, reset, rebooted, and/or otherwise initialized such that the BIOS engine 1206 begins an initialization process (e.g., Power-On STart-up (POST)) for the computing device 1200. As such, one of skill in the art in possession of the present disclosure will appreciate how a BIOS provided by the BIOS engine 1206 may install Reliability, Availability, and Serviceability (RAS) SMI handlers, and/or perform any of a variety of conventional BIOS initialization operations known in the art at block 1302 and during the remainder of the method 1300 (i.e., in addition to the hybrid firmware-first/operating-system-first error handling operations described below) that provide for the initialization of the computing device 1200 such that an operating system provided by the operating system engine 1210 may take over control of the processing system 1204 and the computing device 1200.

Figure 14:
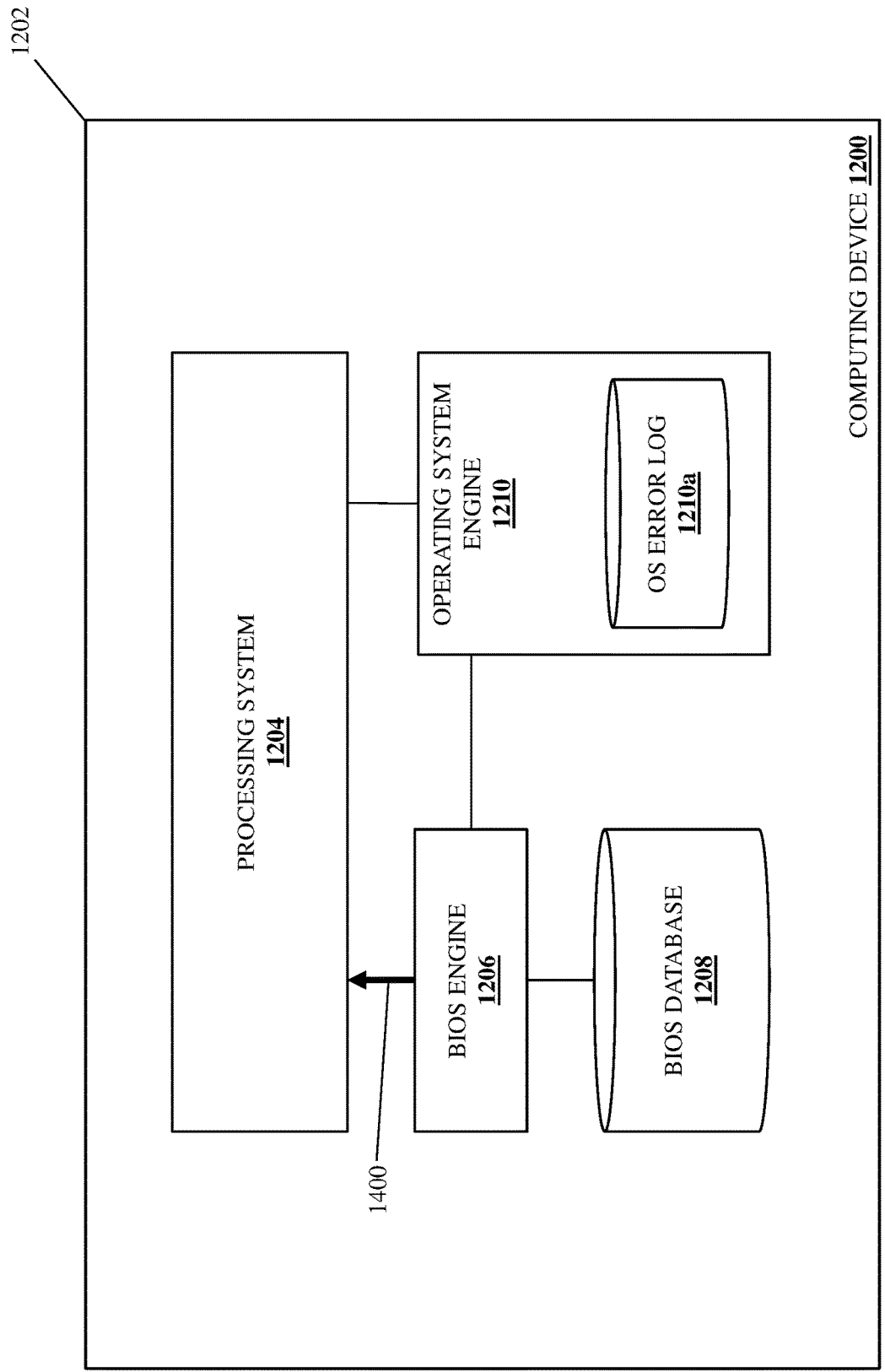
FIG. 14 is a schematic view illustrating an embodiment of the computing device of FIG. 12 operating during the method of FIGS. 13A and 13B.

The method 1300 then proceeds to block 1304 where the BIOS subsystem configures a processing system to perform processing system firmware-first error handling operations. With reference to FIG. 14, in an embodiment of block 1304, the BIOS engine 1206 may perform processing system configuration operations 1400 that may include configuring the processing system 1204 to perform the processing system firmware-first error handling operations described below. For example, at block 1304 and in response to beginning the initialization process for the computing device 1200, a BIOS POST RAS Direct execution Environment (DXE) driver in the BIOS engine 1206 may operate to configure chipset RAS registers in a chipset included in the processing system 1204 in a manner that one of skill in the art in possession of the present disclosure will recognize configures the chipset to generate an SMI when an asynchronous machine check, Input/Output (I/O) error, and/or other errors are detected in the computing device 1200. Furthermore, the processing system configuration operations 1400 performed by the BIOS engine 1206 may also include the BIOS registering BIOS RAS SMM handling procedures in the chipset included in the processing system 1204, and/or providing any other processing system configuration that would be apparent to one of skill in the art in possession of the present disclosure.

As will be appreciated by one of skill in the art in possession of the present disclosure, the configuration of the chipset RAS registers in the chipset included in the processing system 1204 as described above to configure the processing system 1204 to perform processing system firmware-first error handling operations may allow the BIOS provided by the BIOS engine 1206 to perform BIOS firmware-first error handling operations that may include the performance of the registered BIOS RAS SMM handling procedures discussed above in response to the chipset detecting errors and generating corresponding SMIs (i.e., due to the configuration of the chipset RAS registers described above). However, while a particular processing system configuration, particular processing system firmware-first error handling operations, and particular BIOS firmware-first error handling operations are described herein, one of skill in the art in possession of the present disclosure will appreciate how the firmware-first error handling operations discussed below may be enabled in a variety of manners that will fall within the scope of the present disclosure as well.

The method 1300 then proceeds to decision block 1306 where the method 1300 proceeds depending on whether an initialization instruction is received. As will be appreciated by one of skill in the art in possession of the present disclosure, in an embodiment of decision block 1306 and following the enablement of the firmware-first error handling (e.g., via the configuration of the processing system 1204 at block 1304) as described above, the method 1300 may proceed depending on whether an initialization instruction (e.g., a reset, reboot, and/or other initialization instruction that would be apparent to one of skill in the art in possession of the present disclosure) is received. For example, some embodiments of the present disclosure may include an operating system engine 1210 that provides an operating system that is not configured to perform operating-system-first error handling (discussed in further detail below), and one of skill in the art in possession of the present disclosure will appreciate how decision block 1306 may provide for the performance of firmware-first error handling by a BIOS provided by the BIOS engine 1206 for the remainder of the initialization process for the computing device 1200 and during a runtime of the computing device 1200 until an initialization instruction has been received. As such, if at decision block 1306 an initialization instruction is received, the method 1300 returns to block 1302 and the operations of the BIOS subsystem at blocks 1302 and 1304 discussed above may be repeated to again configure the computing device 1200 to perform firmware-first error handling.

Figure 15:
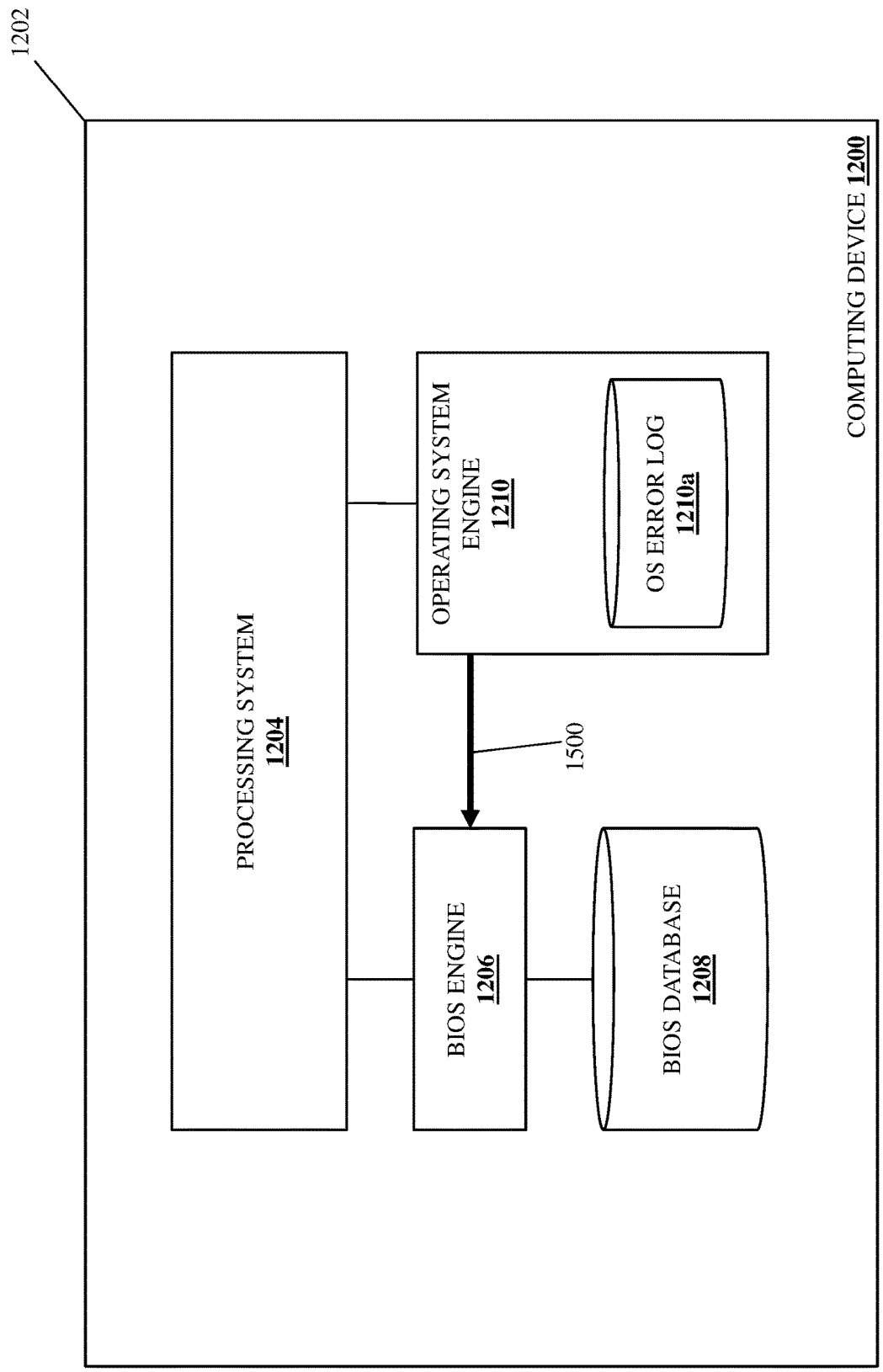
FIG. 15 is a schematic view illustrating an embodiment of the computing device of FIG. 12 operating during the method of FIGS. 13A and 13B.

If, at decision block 1306, an initialization instruction is not received, the method 1300 proceeds to decision block 1308 where it is determined whether an operating system is configured to perform error handling. With reference to FIG. 15, in an embodiment of decision block 1308 and during the initialization process for the computing device 1200, the operating system engine 1210 may perform error handling identification operations 1500 that may include identifying whether an operating system provided by the operating system engine 1210 is configured to perform error handling. As such, one of skill in the art in possession of the present disclosure will appreciate how the BIOS provided by the BIOS engine 1206 may determine whether the operating system provided by the operating system engine 1210 is configured to perform error handling operations based on the identification by the operating system of whether it supports error handling operations.

For example, during the initialization process for the computing device 1200, an operating system provided by the operating system engine 1210 may generate a first Advanced Configuration and Power Interface (ACPI) Operating System Capabilities (_OSC) communication, and may transmit that first ACPI _OSC communication via ACPI Machine Language (AML) code to a BIOS provided by the BIOS engine 1206 (e.g., by calling an AML _OSC communication method in AML code included in the BIOS). In a specific example, the first ACPI _OSC communication may be provided in a buffer or other data storage element and may include flags or other error handling configuration identifiers that one of skill in the art in possession of the present disclosure would recognize as indicating to the BIOS provided by the BIOS engine 1206 control features supported by the operating system provided by the operating system engine 1210.

As such, one of skill in the art in possession of the present disclosure will appreciate how the BIOS provided by the BIOS engine 1206 may review the first ACPI _OSC communication (e.g., the flags or other error handling configuration identifiers in the buffer or other data storage element discussed above) to determine whether the control features supported by the operating system provided by the operating system engine 1210 indicate that the operating system is configured to perform error handling operations. Thus, using the specific examples provided above, one of skill in the art in possession of the present disclosure will appreciate how any ACPI Platform Error Interface (APEI)-capable operating system may be configured to identify its error handling capabilities to the BIOS and thus take over control of RAS error handling from the BIOS as described below. However, while a specific example of the identification of operating system error handling capabilities has been described, one of skill in the art in possession of the present disclosure will appreciate how the BIOS may determine error handling capabilities of the operating system using a variety of techniques that will fall within the scope of the present disclosure as well.

If, at decision block 1308, it is determined that the operating system is not configured to perform error handling, the method 1300 proceeds to decision block 1310 where the method 1300 proceeds depending on whether an error is detected. In an embodiment of decision block 1308, the BIOS provided by the BIOS engine 1206 may determine that the operating system provided by the operating system engine 1210 is not configured to perform error handling (e.g., the flags or other error handling configuration identifiers in the buffer or other data storage element provided in the first ACPI _OSC communication as described above indicate that the operating system is not configured to perform error handling operations), and thus may operate to perform firmware-first error handling operations. As such, the method 1300 may proceed at decision block 1310 depending on whether an error is detected such that those firmware-first error handling operations should be performed. For example, at decision block 1310, the chipset that is included in the processing system 1204 will monitor for asynchronous machine checks, Input/Output (I/O) errors, and/or other errors that one of skill in the art in possession of the present disclosure will recognize may occur in the computing device 1200 and, in the event such an error is detected, will operate to generate and SMI as described above (i.e., due to the configuration of the chipset RAS registers described above).

If, at decision block 1310, no error is detected, the method 1300 returns to decision block 1306. As such, following the configuration of the processing system to perform the processing system firmware-first error handling operations at block 1304 that configure the computing device 1200 with a firmware-first error handling model as described above and in situations in which the operating system provided by the operating system engine 1210 is not configured to perform error handling operations, the computing device 1200 will remain configured with that firmware-first error handling model and will monitor for errors as long as no initialization instruction is received. Similarly, following the configuration of the processing system to perform the processing system firmware-first error handling operations at block 1304 that configure the computing device 1200 with a firmware-first error handling model as described above and in situations in which it has not yet been the operating system provided by the operating system engine 1210 is configured to perform error handling operations, the computing device 1200 will remain configured with that firmware-first error handling model and will monitor for errors until it is determined that the operating system is configured to perform error handling operations and as long as no initialization instruction is received.

Figure 16:
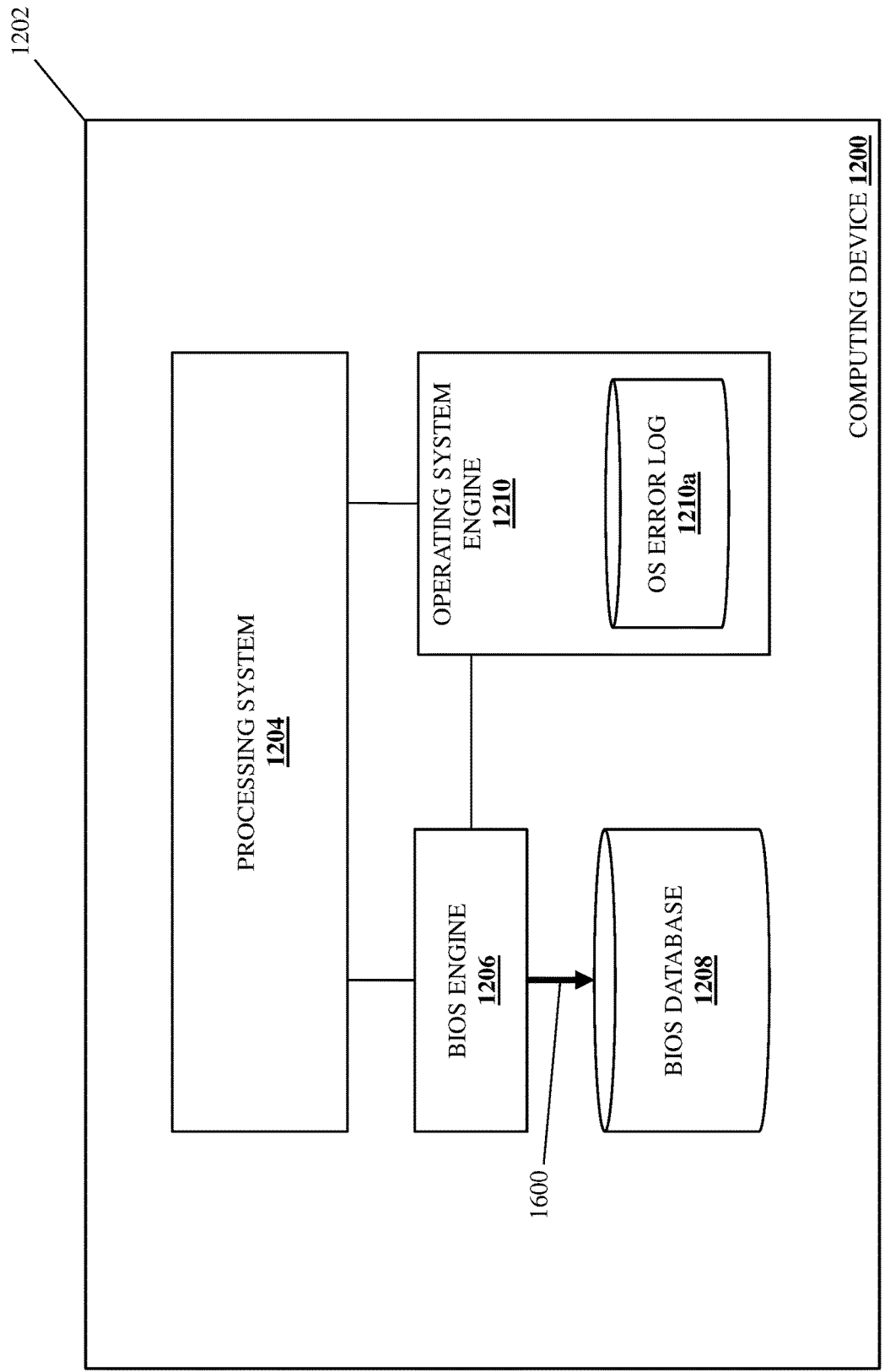
FIG. 16 is a schematic view illustrating an embodiment of the computing device of FIG. 12 operating during the method of FIGS. 13A and 13B.
Figure 17:
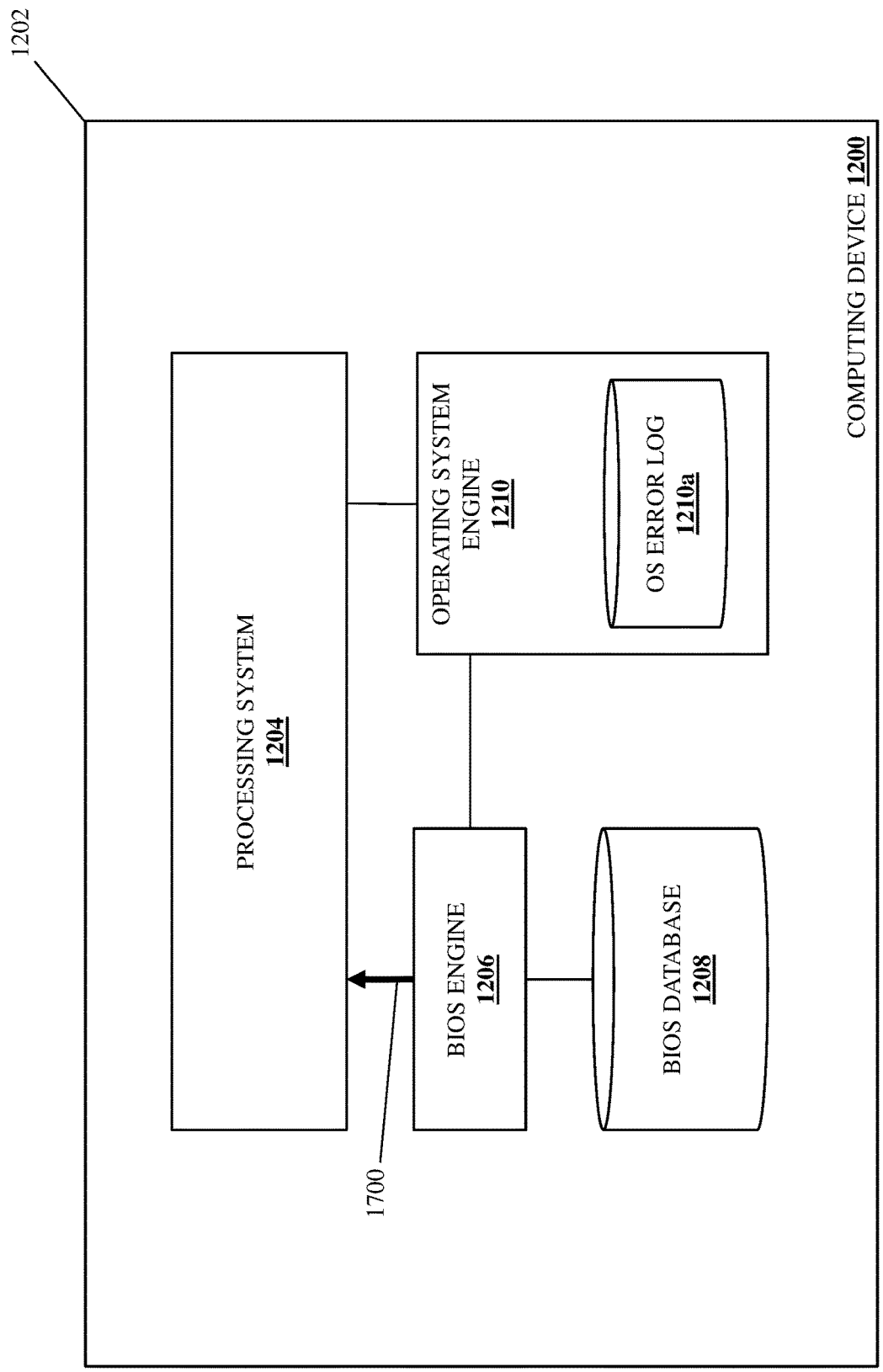
FIG. 17 is a schematic view illustrating an embodiment of the computing device of FIG. 12 operating during the method of FIGS. 13A and 13B.

If, at decision block 1310, an error is detected, the method 1300 proceeds to block 1312 where the BIOS subsystem performs BIOS firmware-first error handling operations. With reference to FIG. 16, in an embodiment of block 1312 and in response to an error being detected at decision block 1310, the BIOS engine 1206 may perform BIOS firmware-first error handling operations 1600 that may include generating and storing an error record for that error in the BIOS database 1208. For example, as described above, in response to an error being detected at decision block 1310, the chipset included in the processing system 1204 may generate an SMI (i.e., due to the configuration of the chipset RAS registers described above), which one of skill in the art in possession of the present disclosure will appreciate will cause the computing device 1200 to enter a SMM and will allow the BIOS provided by the BIOS engine 1206 to perform registered BIOS RAS SMM handling procedures that may include identifying the error that was detected, generating an error record and/or other error information, storing that error record and/or other error information in the BIOS database 1208, and/or performing any other BIOS firmware-first error handling operations that would be apparent to one of skill in the art in possession of the present disclosure.

With reference back to the computing device 200 discussed above with reference to FIG. 2 and as described above, a communication interface (e.g., the IPMI KCS direct communication interface described above) may be provided between the BMC engine 208a and the BIOS engine 212/1206, and the BMC engine 208a and the BIOS engine 212/1206 may be configured to communicate asynchronously with each other (e.g., via interrupts) in order to synchronize the error records and/or other error information in the BIOS database 1208 with the BMC database 208b, which as described above may allow the computing device management system 302 to access and retrieve the error records and/or other error information in the BMC database 208b (i.e., as the BMC device 208 is accessible to the computing device management system 302 via the network 304). Furthermore, one of skill in the art in possession of the present disclosure will appreciate how the BIOS provided by the BIOS engine 1206 may conceal relatively low severity errors (e.g., corrected errors) that are detected at decision block 1310 from the operating system provided by the operating system engine 1210, while the BIOS may identify, propagate, and/or otherwise provide relatively high severity errors that are detected at decision block 1310 to the operating system provided by the operating system engine 1210. However, while a few specific examples of firmware-first error handling operations have been described, one of skill in the art in possession of the present disclosure will appreciate how a variety of other firmware-first error handling operations will fall within the scope of the present disclosure as well.

Following block 1312, the method 1300 returns to decision block 1306. As such, following the configuration of the processing system to perform the processing system firmware-first error handling operations at block 1304 that configure the computing device 1200 with a firmware-first error handling model as described above and in situations in which the operating system provided by the operating system engine 1210 is not configured to perform error handling operations, the computing device 1200 will remain configured with that firmware-first error handling model and will perform firmware-first error handling operations for any detected errors as long as no initialization instruction is received. Similarly, following the configuration of the processing system to perform the processing system firmware-first error handling operations at block 1304 that configure the computing device 1200 with a firmware-first error handling model as described above and in situations in which it has not yet been determined that the operating system provided by the operating system engine 1210 is configured to perform error handling operations, the computing device 1200 will remain configured with that firmware-first error handling model and will perform firmware-first error handling operations for any detected errors until it is determined that the operating system is configured to perform error handling operations and as long as no initialization instruction is received.

If, at decision block 1308, it is determined that the operating system is configured to perform error handling, the method 1300 proceeds to block 1314 where the BIOS subsystem disables the performance of processing system firmware-first error handling operations by the processing system. In an embodiment, at block 1314 and in response to determining that the operating system is configured to perform error handling, the BIOS engine 1206 may perform processing system firmware-first error handling disabling operations 1700 that include disabling the performance of processing system firmware-first error handling operations by the processing system 1204. In an embodiment of decision block 1308, the BIOS provided by the BIOS engine 1206 may determine that the operating system provided by the operating system engine 1210 is configured to perform error handling (e.g., the flags or other error handling configuration identifiers in the buffer or other data storage element provided in the first ACPI _OSC communication as described above indicate that the operating system is configured to perform error handling operations), and thus may operate to disable firmware-first error handling operations.

For example, in an embodiment of block 1314, the processing system firmware-first error handling disabling operations 1700 performed by the BIOS provided by the BIOS engine 1206 may include the BIOS to generating a software SMI ("soft SMI") and subsequently clearing the chipset RAS registers that were configured at block 1304 in the chipset included in the processing system 1204 in a manner that disables the chipset from generating an SMI when an asynchronous machine check, Input/Output (I/O) error, and/or other errors are detected in the computing device 1200 as discussed above. Furthermore, the processing system firmware-first error handling disabling operations 1700 performed by the BIOS provided by the BIOS engine 1206 may include the BIOS unregistering BIS RAS SMM handling procedures that were previously registered in the chipset included in the processing system 1204, and/or performing any other configuration or reconfiguration of the processing system 1204 that one of skill in the art in possession of the present disclosure would recognize as disabling it from performing any processing system firmware-first error handling operations.

As will be appreciated by one of skill in the art in possession of the present disclosure, the clearing of the chipset RAS registers in, and unregistering of the BIOS RAS SMM handling procedures with, the chipset included in the processing system 1204 as described above to disable the processing system 1204 from performing processing system firmware-first error handling operations will prevent the BIOS provided by the BIOS engine 1206 from performing the BIOS firmware-first error handling operations discussed above that include the performance of BIOS RAS SMM handling procedures. However, while specific techniques for disabling firmware-first error handling operations have been described, one of skill in the art in possession of the present disclosure will appreciate how firmware-first error handling operations may be disabled in a variety of manners that will fall within the scope of the present disclosure as well.

Figure 18:
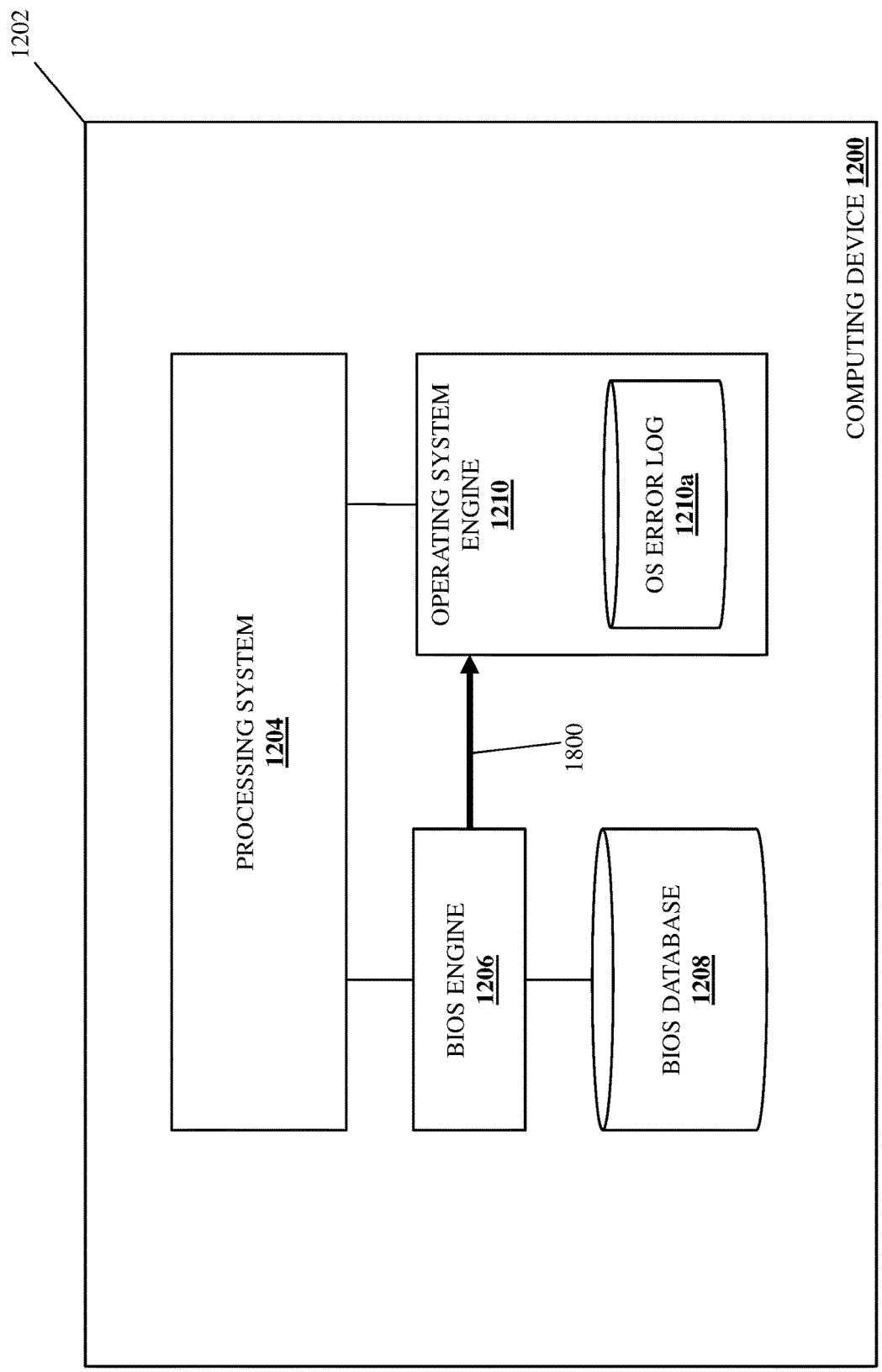
FIG. 18 is a schematic view illustrating an embodiment of the computing device of FIG. 12 operating during the method of FIGS. 13A and 13B.

The method 1300 then proceeds to block 1316 where the BIOS subsystem instructs the operating system to perform operating-system-first error handling operations. With reference to FIG. 18, in an embodiment of block 1316, the BIOS engine 1206 performs operating-system-first error handling instruction operations 1800 that include instructing the operating system engine 1210 to perform operating-system-first error handling operations. For example, the operating-system-first error handling instruction operations 1800 performed by the BIOS provided by the BIOS engine 1206 will include the BIOS generating a second ACPI _OSC communication, and transmitting that second ACPI _OSC communication to the operating system provided by the operating system engine 1210 (e.g., via an AML _OSC handshake procedure as part of the AML _OSC communication method described above). In a specific example, the second ACPI _OSC communication may be provided in a buffer or other data storage element and may include flags or other error handling configuration identifiers that one of skill in the art in possession of the present disclosure would recognize as indicating to the operating system provided by the operating system engine 1210 the error handling operations and/or other control features that the BIOS provided by the BIOS engine 1206 will relinquish to the operating system.

Thus, as will be appreciated by one of skill in the art in possession of the present disclosure, during the initialization process for the computing device 1200 and upon the BIOS provided by the BIOS engine 1206 handing off control of the processing system 1204 to the operating system (e.g., an operating system boot loader) provided by the operating system engine 1210 (e.g., via the invocation of a UEFI "ExitBootServices" Application Programming Interface (API), an ACPI_ON instruction, etc.), RAS control will be relinquished by the BIOS to the operating system provided by the operating system engine 1210 (e.g., to operating system error handling subsystems such as the error handling sub-engine 204*a* in the operating system engine 204 in the computing device 200 discussed above with reference to FIG. 2).

The method 1300 then proceeds to decision block 1318 where the method 1300 proceeds depending on whether an initialization instruction is received. As will be appreciated by one of skill in the art in possession of the present disclosure, in an embodiment of decision block 1318 and following the enablement of the operating-system-first error handling (e.g., via the instructing of the operating system at block 1316) as described above, the method 1300 may proceed depending on whether an initialization instruction (e.g., a reset, reboot, and/or other initialization instruction that would be apparent to one of skill in the art in possession of the present disclosure) is received. For example, one of skill in the art in possession of the present disclosure will appreciate how decision block 1318 may provide for the performance of operating-system-first error handling by the operating system provided by the operating system engine 1210 for the remainder of the initialization process for the computing device 1200 and during a runtime of the computing device 1200 until an initialization instruction has been received. As such, if at decision block 1318 an initialization instruction is received, the method 1300 returns to block 1302.

If, at decision block 1318, an initialization instruction is not received, the method 1300 proceeds to decision block 1320 where the method 1300 proceeds depending on whether an error is detected. In an embodiment, the method 1300 may proceed at decision block 1320 depending on whether an error is detected such that operating-system-first error handling operations should be performed. Similarly as described above with reference to block 404 of the method 400, at decision block 1320, the operating system engine 1210 (e.g., the error handling sub-engine 204*a* in the operating system engine 204 discussed above with reference to FIG. 2) may perform error identification operations that may include identifying any error that occurs in any computing components included in the computing device 1200 (e.g., any of the computing components 210 in the computing device 200 discussed above with reference to FIG. 2). If, at decision block 1320, no error is detected, the method 1300 returns to decision block 1318. As such, following the configuration of the operating system to perform the operating-system-first error handling operations at block 1316 that configure the computing device 1200 with an operating-system-first error handling model as described above, the computing device 1200 will remain configured with that operating-system-first error handling model and will monitor for errors as long as no initialization instruction is received.

If, at decision block 1320, an error is detected, the method 1300 proceeds to block 1322 where the operating system performs operating-system-first error handling operations. In an embodiment, at decision block 1322 and in response to an error being detected at decision block 1320, the operating system provided by the operating system engine 1210 may perform operating-system-first error handling operations that may include, for example, generating an error record or other error information similarly as described above with reference to block 406 of the method 500, storing that error record or other error information in the operating system error log 1210*a*, and/or performing any other operating-system-first error handling operations that would be apparent to one of skill in the art in possession of the present disclosure. As such, one of skill in the art in possession of the present disclosure will appreciate how, in some embodiments, the operating-system-first error handling operations performed by the operating system at block 1322 may be conventional operating-system-first error handling operations that only provide for the storage of error records and/or other error information in the operating system error log 1210*a*.

However, one of skill in the art in possession of the present disclosure will also appreciate how, in some embodiments, the operating-system-first error handling operations performed by the operating system at block 1322 may be the operating-system-first error handling operations described above with reference to the method 400. As such, the operating-system-first error handling operations performed by the operating system at block 1322 may include the operating system accessing error handling information in a reserved memory subsystem as described above with reference to block 408 of the method 400, storing the error record in a shared memory subsystem based on that error handling information as described above with reference to block 410 of the method 400, and notifying a BMC device of the error record stored in the shared memory subsystem as described above with reference to block 412 of the method 400 such that the BMC device accesses that error information and transmits it to a computing device management system as described above with reference to block 414 of the method 400.

Following block 1322, the method 1300 returns to decision block 1318. As such, following the configuration of the operating system to perform the operating-system-first error handling operations at block 1316 that configure the computing device 1200 with an operating-system-first error handling model as described above, the computing device 1200 will remain configured with that operating-system-first error handling model and will perform operating-system-first error handling operations for any detected errors as long as no initialization instruction is received.

Thus, systems and methods have been described that provide for firmware-first error handling operations during initialization of a computing device, and operating-system-first error handling during runtime of the computing device. For example, the hybrid firmware-first/operating-system-first error handling system of the present disclosure may include a Basic Input/Output System (BIOS) subsystem coupled to a processing system. The BIOS subsystem begins an initialization process for a computing device and, in response, configures the processing system to perform processing system firmware-first error handling operations and, for any errors that are detected during at least a portion of the initialization process, performs BIOS firmware-first error handling operations. During the initialization process, the BIOS subsystem determines that an operating system provided by the processing system is configured to perform error handling and, in response, disables the performance of processing system firmware-first error handling operations by the processing system, and instructs the operating system to perform operating-system-first error handling operations such that the operating system performs the operating-system-first error handling operations for any errors that are detected during runtime of the computing device. As such, error handling during initialization of computing devices that utilize operating-system-first error handling models is enabled, addressing the computing device management issues with computing devices that utilize operating-system-first error handling models discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hybrid firmware-first/operating-system-first error handling system, comprising:
   a processing system; and
   a Basic Input/Output System (BIOS) subsystem that is coupled to the processing system and that is configured to:
      begin an initialization process for a computing device and, in response, configure the processing system to perform processing system firmware-first error handling operations;
      perform, for any errors that are detected during at least a portion of the initialization process, BIOS firmware-first error handling operations;
      determine, during the initialization process, that an operating system provided by the processing system is configured to perform error handling;
      disable, during the initialization process, prior to the BIOS subsystem handing off control of the processing system to the operating system, and in response to determining that the operating system is configured to perform error handling, the performance of processing system firmware-first error handling operations by the processing system;
      instruct, during the initialization process and prior to the BIOS subsystem handing off control of the processing system to the operating system, the operating system to perform operating-system-first error handling operations such that the operating system performs the operating-system-first error handling operations for any errors that are detected during a remainder of the initialization process and during a runtime of the computing device that occurs subsequent to the BIOS subsystem handing off control of the processing system to the operating system.

2. The system of claim 1, wherein the configuring the processing system to perform the processing system firmware-first error handling operations include configuring at least one register in the processing system to cause the processing system to generate a System Management Interrupt (SMI) in response to detecting an error.

3. The system of claim 2, wherein the disabling the performance of processing system firmware-first error handling operations by the processing system includes clearing the at least one register in the processing system to disable the processing system from generating the SMI in response to detecting an error.

4. The system of claim 1, wherein the determining that the operating system is configured to perform error handling includes:
   identifying, in a first Advanced Configuration and Power Interface (ACPI) Operating System Capabilities (_OSC) communication provided via ACPI Machine Language (AML) code by the operating system, error handling capabilities of the operating system.

5. The system of claim 4, wherein the instructing the operating system to perform the operating-system-first error handling operations includes:
   instructing, via a second ACPI _OSC communication, the operating system to utilize the error handling capabilities of the operating system to perform the operating-system-first error handling operations.

6. The system of claim 1, wherein the operating system performs the operating-system-first error handling operations for any errors that are detected during the remainder of the initialization process in response to being instructed to perform the operating-system-first error handling operations during the initialization process.

7. The system of claim 1, further comprising:
   a Baseboard Management Controller (BMC) device that is coupled to the processing system, wherein the operating-system-first error handling operations performed by the operating system include storing error information for any errors that are detected in the BMC device.

8. An Information Handling System (IHS), comprising:
   a Basic Input/Output System (BIOS) processing system; and
   a BIOS memory system that is coupled to the BIOS processing system and that includes instructions that, when executed by the BIOS processing system, cause the BIOS processing system to provide a BIOS engine that is configured to:
      begin an initialization process for a computing device and, in response, configure a primary processing system in the computing device to perform primary processing system firmware-first error handling operations;
      perform, for any errors that are detected during at least a portion of the initialization process, BIOS firmware-first error handling operations;
      determine, during the initialization process, that an operating system provided by the primary processing system is configured to perform error handling;
      disable, during the initialization process, prior to the BIOS engine handing off control of the primary processing system to the operating system, and in response to determining that the operating system is configured to perform error handling, the performance of primary processing system firmware-first error handling operations by the primary processing system;
      instruct, during the initialization process and prior to the BIOS engine handing off control of the primary processing system to the operating system, the operating system to perform operating-system-first error handling operations such that the operating system performs the operating-system-first error handling operations for any errors that are detected during a remainder of the initialization process and during a runtime of the computing device that occurs subsequent to the BIOS engine handing off control of the primary processing system to the operating system.

9. The IHS of claim 8, wherein the configuring the primary processing system to perform the primary processing system firmware-first error handling operations include configuring at least one register in the primary processing system to cause the primary processing system to generate a System Management Interrupt (SMI) in response to detecting an error.

10. The IHS of claim 9, wherein the disabling the performance of primary processing system firmware-first error handling operations by the primary processing system includes clearing the at least one register in the primary processing system to disable the primary processing system from generating the SMI in response to detecting an error.

11. The IHS of claim 8, wherein the determining that the operating system is configured to perform error handling includes:
    identifying, in a first Advanced Configuration and Power Interface (ACPI) Operating System Capabilities (_OSC) communication provided via ACPI Machine Language (AML) code by the operating system, error handling capabilities of the operating system.

12. The IHS of claim 11, wherein the instructing the operating system to perform the operating-system-first error handling operations includes:
    instructing, via a second ACPI _OSC communication, the operating system to utilize the error handling capabilities of the operating system to perform the operating-system-first error handling operations.

13. The IHS of claim 8, wherein the operating system performs the operating-system-first error handling operations for any errors that are detected during the remainder of the initialization process in response to being instructed to perform the operating-system-first error handling operations during the initialization process.

14. A method for handling errors in a computing device, comprising:
    beginning, by a Basic Input/Output System (BIOS) subsystem, an initialization process for the computing device and, in response, configuring a processing system in the computing device to perform processing system firmware-first error handling operations;
    performing, by the BIOS subsystem for any errors that are detected during at least a portion of the initialization process, BIOS firmware-first error handling operations;
    determining, by the BIOS subsystem during the initialization process, that an operating system provided by the processing system is configured to perform error handling;
    disabling, by the BIOS subsystem during the initialization process, prior to the BIOS subsystem handing off control of the processing system to the operating system, and in response to determining that the operating system is configured to perform error handling, the performance of processing system firmware-first error handling operations by the processing system;
    instructing, by the BIOS subsystem during the initialization process and prior to the BIOS subsystem handing off control of the processing system to the operating system, the operating system to perform operating-system-first error handling operations such that the operating system performs the operating-system-first error handling operations for any errors that are detected during a remainder of the initialization process and during a runtime of the computing device that occurs subsequent to the BIOS subsystem handing off control of the processing system to the operating system.

15. The method of claim 14, wherein the configuring the processing system to perform the processing system firmware-first error handling operations include configuring at least one register in the processing system to cause the processing system to generate a System Management Interrupt (SMI) in response to detecting an error.

16. The method of claim 15, wherein the disabling the performance of processing system firmware-first error handling operations by the processing system includes clearing the at least one register in the processing system to disable the processing system from generating the SMI in response to detecting an error.

17. The method of claim 14, wherein the determining that the operating system is configured to perform error handling includes:
    identifying, in a first Advanced Configuration and Power Interface (ACPI) Operating System Capabilities (_OSC) communication provided via ACPI Machine Language (AML) code by the operating system, error handling capabilities of the operating system.

18. The method of claim 17, wherein the instructing the operating system to perform the operating-system-first error handling operations includes:
    instructing, via a second ACPI _OSC communication, the operating system to utilize the error handling capabilities of the operating system to perform the operating-system-first error handling operations.

19. The method of claim 14, wherein the operating system performs the operating-system-first error handling operations for any errors that are detected during the remainder of the initialization process in response to being instructed to perform the operating-system-first error handling operations during the initialization process.

20. The method of claim 14, wherein the operating-system-first error handling operations performed by the operating system include storing error information for any errors that are detected in a BMC device that is included in the computing device.

* * * * *